United States Patent [19]
Yokoyama et al.

[11] Patent Number: 5,629,852
[45] Date of Patent: May 13, 1997

[54] VEHICLE CONTROL DEVICE FOR CONTROLLING OUTPUT POWER OF MULTI-CYLINDER ENGINE UPON EMERGENCY

[75] Inventors: Etsuya Yokoyama; Nobutake Taniguchi, both of Himeji, Japan

[73] Assignee: Mitsubishi Denki Kabushiki Kaisha, Tokyo, Japan

[21] Appl. No.: 202,150

[22] Filed: Feb. 25, 1994

[30] Foreign Application Priority Data

Feb. 26, 1993 [JP] Japan .................................. 5-038474
Mar. 11, 1993 [JP] Japan .................................. 5-051010
Mar. 25, 1993 [JP] Japan .................................. 5-066706

[51] Int. Cl.$^6$ .................................................. F02D 29/00
[52] U.S. Cl. .................................................. 364/431.03
[58] Field of Search ...................... 123/198 F, 493, 123/361, 399, 198 DB, 350, 359, 479; 74/866; 364/424.1, 431.09, 431.07, 424.05; 340/456; 73/118

[56] References Cited

U.S. PATENT DOCUMENTS

| | | | |
|---|---|---|---|
| 4,080,947 | 3/1978 | Iizuka | 123/198 F |
| 4,439,833 | 3/1984 | Yamaguchi et al. | 364/431.09 |
| 4,539,643 | 9/1985 | Suzuki et al. | 361/431.09 |
| 4,637,361 | 1/1987 | Killen et al. | 123/339 |
| 4,638,781 | 1/1987 | Shiki et al. | 123/493 |
| 4,779,597 | 10/1988 | Takaku et al. | 123/479 |
| 4,833,613 | 5/1989 | Mack et al. | 364/424.05 |
| 4,872,435 | 10/1989 | Ueyama et al. | 123/336 |
| 4,975,845 | 12/1990 | Mehta | 364/424.1 |
| 5,031,715 | 7/1991 | Ogawa et al. | 180/179 |
| 5,056,022 | 10/1991 | Witkowski et al. | 364/424.1 |
| 5,074,267 | 12/1991 | Ironside et al. | 123/399 |
| 5,092,298 | 3/1992 | Suzuki et al. | 123/361 |
| 5,101,786 | 4/1992 | Kamio et al. | 123/399 |
| 5,117,711 | 6/1992 | Iizuka | 74/866 |
| 5,150,681 | 9/1992 | Kull et al. | 123/399 |
| 5,159,831 | 11/1992 | Kitagawa et al. | 73/118 |
| 5,193,506 | 3/1993 | Ironside et al. | 123/399 |
| 5,265,572 | 11/1993 | Kadomukai et al. | 123/396 |
| 5,303,581 | 4/1994 | McQueen | 73/118.1 |

FOREIGN PATENT DOCUMENTS

| | | |
|---|---|---|
| 8441 | 1/1986 | Japan . |
| 109244 | 5/1988 | Japan . |
| 286837 | 11/1990 | Japan . |

*Primary Examiner*—Kevin J. Teska
*Assistant Examiner*—Dan Fiul
*Attorney, Agent, or Firm*—Sughrue, Mion, Zinn, Macpeak & Seas

[57] ABSTRACT

Upon an occurrence of a failure in the throttle valve driving system of an engine provided with a throttle actuator 7, a vehicle control device for controlling the output power of the engine disables some of the cylinders (1) in accordance with the outputs of the acceleration pedal position sensor 61 and the throttle position sensor 17 when the vehicle is being driven (i.e., when the transmission is not in the neutral or the parking position), and (2) in accordance with the output of the throttle position sensor 17 when the vehicle is stopped (i.e., when the transmission is in the neutral or the parking position). Further, the vehicle control device effects fuel cut when the rpm of the engine exceeds a predetermined level. Thus, even upon an occurrence of a failure in the throttle valve drive system, the output power of the engine can be safely controlled solely by means of the acceleration pedal when the vehicle is driven, and is regulated to an appropriate level when the vehicle is stopped. An occurrence of a failure in the throttle valve driving system is detected, for example, when the position of the throttle valve 5 detected by the throttle position sensor 17 deviates from the target position thereof.

13 Claims, 25 Drawing Sheets

FIG. 2a
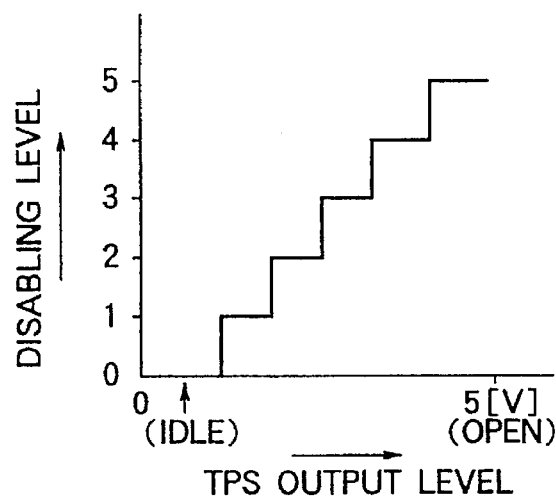
FIG. 2b
| DISABLING LEVEL | DISABLED CYLINDERS |
|---|---|
| 1 | 1 |
| 2 | 1, 4 |
| 3 | 1, 3, 5 |
| 4 | 1, 2, 4, 5 |
| 5 | 1, 2, 4, 5, 6 |
FIG. 2c
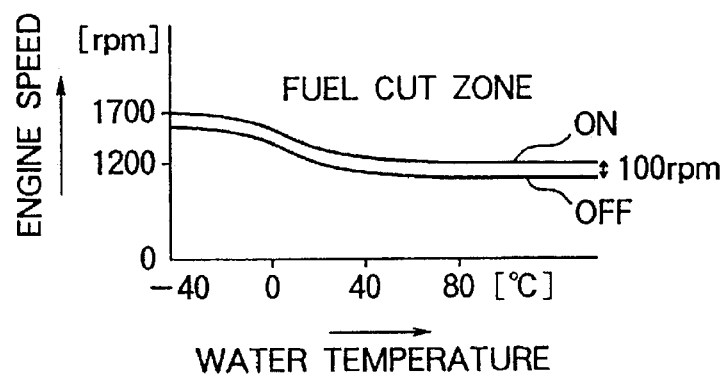

VEHICLE CONTROL DEVICE FOR CONTROLLING OUTPUT POWER OF MULTI-CYLINDER ENGINE UPON EMERGENCY

BACKGROUND OF THE INVENTION

This invention relates to vehicle control devises which provide the so-called "limp home" function for an automotive vehicle upon emergency (i,e., upon an occurrence of failure of the control driving system of the throttle valve of a multi-cylinder engine), with which the multi-cylinder engine with a linkless throttle control system can be controlled by means of the operation of the acceleration pedal even upon an occurrence of failure.

Conventionally, the output power of the engine of a vehicle is controlled by the driver by means of the acceleration pedal which is mechanically coupled to the throttle valve of the engine, In the came of the so-called linkless throttle control system, however, no mechanical connection exists between the acceleration pedal and the throttle valve, and the position of the throttle valve is controlled by a throttle actuator in response to a control signal supplied from a throttle valve control unit. The control signal is based on the operating condition of the vehicle as well as the position of the acceleration pedal. The output power of the engine can thus be adjusted not only in a accordance with the depression of the acceleration pedal but also in accordance with the operating condition of the vehicle.

FIG. 20 is a partially cut-away perspective view of a throttle body with a conventional emergency throttle operating system, which is disclosed in Japanese Laid-Open Patent (Kokai) No. 63-109244. In FIG, 20, a throttle body 1 is coupled to the air-intake system of the engine to regulate the amount of air taken into the engine. The throttle body 1 includes an air-intake pipe 3, a throttle valve 5 disposed in the air-intake pipe 3, a throttle actuator 7 for opening and closing the throttle valve 5 via a throttle shaft 13. The emergency throttle operating members include an arm 9 detachably attached to the throttle shaft 13, and an operating member 11 engaged with the arm 9.

The throttle valve 5 is fixed to the throttle shaft 13 by means of screws 15. The throttle shaft 13 is coupled to the throttle actuator 7 at one end thereof. The other end of the throttle shaft 13 extends through the throttle position sensor 17 and is urged by a return ,spring 19 toward the idle (i.e., closed) position thereof. At the extreme end of the throttle shaft 13 is formed an attachment portion 21 to which the arm 9 is attached.

The throttle actuator 7, made of a stepping motor, etc., rotates the throttle shaft 13 between the idle and the open position in response to an electrical signal from a controller. The throttle position sensor 17, consisting of a capacitor supported on the throttle shaft 13 and a contact resistor, detects the throttle position and supplies the throttle position signal to the controller. The throttle position is controlled by means of the throttle position sensor 17 and the throttle actuator 7 by a well-known method. The return spring 19 urges the throttle shaft 13 to the idle position where the throttle valve 5 is completely closed. Thus, when the throttle actuator 7 fails, the throttle valve 5 is closed by the return spring 19. The return spring 19 this serves as a fail-safe member and prevents the vehicle from running out of control.

An elongated plate-shaped arm 9 is coupled at the central engagement hole 23 thereof to the attachment portion 21 formed at the end of the throttle shaft 13. At the two ends of the arm 9 are formed engagement grooves 25 which are to be engaged with the throttle valve operating member 11, and, adjacent to the engagement grooves 25 upon the arm 9 are attached a pair of trough-shaped guide members 27. The throttle valve operating member 11 consists of a pair of strings 29 and a handle 31 fixed to the strings 29. Engagement members 33 are secured to the front end of the strings 29.

Next, the operation of the throttle body of FIG. 20 is described. Under normal driving condition, the are 9 and the operating member 11 are detached from the throttle shaft 13. Under this circumstance, the position of the throttle valve 5 is adjusted by the throttle actuator 7 on the basis of the output of the throttle position sensor 17, in response to a control signal from an exterior control unit. The control follows the well-known feedback control method.

When, on the other hand, the normal operation of the throttle valve 5 ceases due to the failure of the throttle control unit or the throttle actuator 7, the throttle valve 5 is closed to the idle position and the vehicle is temporarily stopped. Thereafter, the driver of the vehicle attaches the arm 9 of the throttle operating masher 11 to the attachment portion 21 of the throttle shaft 13 as shown by arrow A, and then, as shown by the arrow B, screws in the fixing nut 35 upon the thread 37 form on the attachment portion 21, such that the arm 9 is fixedly secured to the attachment portion 21.

The engagement members 33 at the ends of the strings 29 extending thresh the respective guide members 27 are engaged with the respective engagement grooves 25 of the arm 9, as shown by the arrows C and D. When the emergency throttle operating members are thus attached to the throttle body 1, the handle 31 is positioned within the passenger compartment, The driver of the vehicle turns the handle 31 in the direction of the arrow E or F, thereby rotating the throttle shaft 13 via the strings 29 and the arm 9 to open or close the throttle valve 5. Thus even upon an occurrence of a failure in the throttle valve drive system, a limited drivability is provided and the vehicle can be driven to a garage for repair.

The above emergency throttle operating method, however, has the following disadvantage. Normally, the emergency throttle operating members are detached from the throttle body. Thus, the emergency throttle operating members must be attached by the driver upon emergency. Further, the position of the throttle valve must be adjusted by hand using the operating member 11, rather than by kicking the acceleration pedal by the foot. The driving of the vehicle thus becomes burdensome and difficult.

FIG. 21 is a block diagram showing the overall structure of another conventional vehicle control device, which is disclosed, for example, in Japanese Laid-Open Patent (Kokai) No. 1-286837. In FIG. 21, a four-cylinder engine 111 is provided with injectors 112 and ignition plugs 113 for respective cylinders. In the air-intake pipe 3 is disposed a throttle valve 5 which is driven by a throttle actuator 7 via a throttle shaft 13. The throttle actuator 7 is made of a DC motor or a stepping motor. A return spring 19 urges the throttle valve 5 to the idle or closed position. The position of the throttle valve 5 is detected by a throttle position sensor 17. An airflow sensor 62 detects the amount of air-intake to the engine 111. A acceleration pedal position sensor 61 detects the kick depth or the depression of the acceleration pedal 61a of the vehicle. An rpm sensor 110 detects the rpm of the engine 111. The outputs of the throttle position sensor 17, the airflow sensor 62, the acceleration pedal position sensor 61, the rpm sensor 110 are input to the control unit 8a which controls the operations of the throttle actuator 7, the injectors 112, and the ignition plugs 113.

FIG. 22 is a flowchart showing the control procedure followed by the vehicle control device of FIG. 21. The procedure of FIG. 22 is performed by the microcomputer within the control unit 8a. At step S31, the acceleration pedal position α is read in. Namely, the control unit 8a determines the acceleration pedal position α from the output of the acceleration pedal position sensor 61 which corresponds to the depression position of the acceleration pedal 61a. Next at step S52, the control unit 8a calculates the target throttle valve position θs. The calculation is performed by: (1) determining a preliminary value of the target throttle valve position θs using a relation between the acceleration pedal position α and the target throttle valve position θs; and (2) multiplying the value obtained in (1) by a correction factor Ne. These steps are performed as follows.

The relation of the acceleration pedal position α and the target throttle valve position θs depends on the output power performance of the vehicle with respect to the acceleration pedal position α. FIG. 23 shows the typical relation between the acceleration pedal position α and the target throttle valve position θs. The curve a shows the relation according to which the target throttle valve position θs is proportional to the acceleration pedal position α. On the other hand, the curve b shows the relation by which the target throttle valve position θs increases slowly in the small depression range of the acceleration pedal position α. If the amount of air-intake varies greatly at the start or during the low speed range of the vehicle, there may be generated a shock and the fine adjustment of the power of the engine becomes difficult, The relation b in FIG. 23, is intended to resolve such problems.

FIG. 24 shows the relation between the rpm of the engine and the correction factor Ne (solid curve) and the relation between the rpm of the engine and the output torque of the engine (dotted curve). As shown by the dotted curve in FIG. 24, the output torque of the engine 111 does not remain constant over the whole range of the rpm of the engine. Namely, the output torque decreases in the, low and the high rpm region. If the target throttle valve position θs as represented by the curve b in FIG. 23 is multiplied by the correction factor Ne which varies as indicated by the solid curve in FIG. 24, the output torque of the engine may be rendered substantially constant. The want of the output power felt by driver in the low and the high rpm region of the engine can thus be eliminated by multiplying the target throttle valve position θs as represented by the curve b of FIG. 23 by the correction factor Ne shown in FIG. 24. It is noted that the relation of the target throttle valve position θs with respect to the acceleration pedal position α of FIG. 23 and the relation of the correction factor Ne with respect to the rpm of the engine show the typical cases. These relations may be modified taking into consideration the characteristic of the vehicle or the output power performance of the engine. At step S32 in FIG. 22, the target throttle valve position θs is calculated by multiplying the target throttle valve position θs as determined by the relation b in FIG. 23 by the correction factor Ne shown in FIG. 24.

Further at step S33, the actual throttle valve position θr is read in from the throttle position sensor 17. At step S34, the deviation e=θs−θr between the target throttle valve position θs and the actual throttle, valve position θr is calculated, and it is judged whether or not the deviation e is greater than 0. Namely, it is Judged whether or not the target throttle valve position θs is greater than the actual throttle valve position θr. If the target throttle valve position θs is greater than the actual throttle valve position θr, the execution proceeds to step S35, where the throttle actuator 7 is driven to rotate the throttle valve 5 toward the opening direction. On the other hand, if the target throttle valve position θs is less than or equal to the actual throttle valve position θr, the execution proceeds to step S36, where (provided that the target throttle valve position θs is not equal to the actual throttle valve position θr) the throttle actuator 7 driven to rotate the throttle valve 5 toward the closing direction.

As described above, in the case of the vehicle control device of FIG. 21, the throttle valve 5 is not mechanically linked with the acceleration pedal 61a, but is driven by the throttle actuator 7. The throttle valve 5 can thus be controlled with a higher degree of freedom. Further, by feeding back the vehicle speed signal to the engine control unit 8b, it is easy to provide the automatic cruising control. This electrical control of the throttle valve 5, however is not without disadvantage, Namely, since the throttle valve 5 is not mechanically linked with the acceleration pedal 61a, the throttle valve 5 may become inoperable due to a failure in the throttle actuator 7 or in the engine control unit 8b and the vehicle may run out of control. A fail-safe measure is thus indispensable.

FIG. 25 is a flowchart showing the fuel injection and the ignition operation of the vehicle control device of FIG. 21. Next, the operation of the vehicle control device of FIG. 21 upon occurrence of a failure is described by reference to FIG. 25

At step S41, the target air-intake $a_t$ is calculated on the basis of the acceleration pedal position α and the rpm of the engine. At step S42, the throttle actuator 7 is controlled to adjust the position of the throttle valve 5 such that the target air-intake $a_t$ is obtained. Next, at step S43, the actual air-intake $a_r$ is read in from the airflow sensor 62. At step S44, the deviation $|a_t - a_r|$ between the target air-intake $a_t$ and the actual air-intake $a_r$ is calculated and it is judged whether or not the deviation $|a_t-a_r|$ is greater than a predetermined reference level K. If the judgement is negative at step S44 (i.e., if $|a_t-a_r|$ is less than or equal to predetermined reference level K), the execution proceeds to step S48, where it is judged whether or not the throttle position sensor 17 is disconnected. The judment at step S48 is made, for example, on the basis of the output of the throttle position sensor 17. If the judgement is negative at step S48, the execution proceeds to step S49, where the normal fuel injection and ignition control operations are performed. Namely, the fuel is injected into all the cylinders, and the amount of injected fuel and the ignition timings are controlled on the basis of the outputs of the airflow sensor 62 and the rpm sensor 110 in accordance with the known method. On the other hand, if the judgement is affirmative at step S48, the execution proceeds to step S45. Further, if the judgement is affirmative at step S44 (if the deviation $|a_t-a_r|$ is less than the predetermined reference level K), the execution proceeds directly to step S45.

At step S45, the acceleration pedal position α is read in from the acceleration pedal position sensor 61. At step S46, the number N=P(α) of the cylinders into which the fuel is injected is determined in accordance with the acceleration pedal position α. Further, at step S47 the ignition timings IG=q(α) are determined in accordance with the acceleration pedal position α. Thus, even when the throttle valve 5 cannot be driven due to a failure in the throttle valve control system, the fuel injection and the ignition are performed by the steps S45 through S47 in FIG. 25. Thus the vehicle control device provides a minimum drivability of the vehicle even upon an occurrence of a failure.

The method shown in FIG. 25 of engine control upon occurrence of a failure, however, has the following disadvantage. Namely, the procedure of FIG. 25 provides the drivability only if, upon occurrence of a failure, the throttle valve 5 is fixed at a position allowing at least a certain amount of air-intake. If the throttle valve 5 is at or near the idle or closed position upon occurrence of failure, it is impossible to obtain enough power and the vehicle can no longer be driven. On the other hand, if the throttle valve 5 is fixed at the fully open position upon occurrence of a failure, the output power of the engine may become too great even though the number of cylinders into which the fuel is injected is limited by the step S46. The safety of the driver may thus be at a risk, FIG. 26 is a block diagram showing the overall structure of a conventional automatic cruising control unit. Within an air-intake pipe 3 is disposed a throttle valve 5 urged by a return spring 19 toward the idle or closed position. The operation of the acceleration pedal 61a or a vacuum actuator 55 is transmitted to a throttle link 50 via a pulley 51, such that the throttle valve 5 is driven toward the open position to allow greater amount of air-intake when the 61a or the 55 is operated. when both the acceleration pedal 61a and the vacuum actuator 55 are operated simultaneously to open the throttle valve 5, the operation or movement which is greater than the other is transmitted to the throttle link 50 through the pulley 51.

The automatic cruising control is effected by adjusting the position of the throttle valve 5 by means of the vacuum actuator 65. Next, the structure of the parts associated with the automatic cruising control is described.

A vacuum pump 58 generates a negative pressure for driving the vacuum actuator 55. A control valve 56 regulates the negative pressure generated by the vacuum pump 58. A release valve 57 completely coleases the negative pressure within to the ambient atmospheric pressure, and thereby stops driving the vacuum actuator 55. On the basis of the vehicle speed information obtained from a vehicle speed sensor 73, an automatic cruising control unit 70 controls the operations of the vacuum pump 58, the control valve 56, and the release valve 57 to adjust the position the throttle valve 5. To the automatic cruising control unit 70 are coupled various switches such as: a set switch 151 for instructing the commencement of the automatic cruising control, a resume switch 152 for instructing the restarting of the automatic cruising control at the vehicle speed set and stored in the automatic cruising control unit 70; a release switch 153 for instructing an interruption of the automatic cruising control; and a brake switch 154 linked with the brake of the vehicle for releasing the automatic cruising control upon detection of the operation of the brake.

FIG. 27 is a flowchart showing the automatic cruising control operation of the automatic cruising control unit of FIG. 26. FIG. 29 1s a timing chart showing waveforms of various signals generated in the vehicle control device of FIG. 26 during the automatic cruising control procedure. The top waveform shows the output of the set switch 151 by which the automatic cruising control is commenced. The waveforms thereunder are: the acceleration pedal position $\alpha$; the actual throttle valve position $\theta r$; the control signal for driving the release valve 57; the control signal for driving the vacuum pump 58; the control signal for driving the control valve 56; and the actual vehicle speed $V_A$. On top of the waveforms are shown the corresponding steps S73 through S76 in the flowchart of FIG. 27.

At step S71 in FIG. 27, It is judged whether or not the commencement of the automatic cruising control has been instructed by the set switch 151. If the instruction is not present, the step S71 is repeated to wait for the input of the instruction. On the other hand, if the instruction is input from the set switch 151, the execution proceeds to step S72, where the current actual vehicle speed $V_A$ detected by the vehicle speed sensor 73 is stored as the target vehicle speed $V_T$. Next, at step S73, the initial position of the throttle valve 5 is set as described below.

FIG. 28a shows the relation between the vehicle speed V and the initial position $\theta$ of the throttle valve for maintaining the vehicle speed V. FIG. 28b shows the relation between the target vehicle speed $V_T$ and the drive time T of the vacuum pump for attaining the initial throttle valve position $\theta$ as required by the relation of FIG. 28a, The vacuum pump 58 is supplied with an initial pulse (see the waveform in FIG. 29) such that it is driven for the time T corresponding to the target vehicle speed $V_T$. The throttle valve 5 is thus adjusted to the initial position.

Next, at step S74, the throttle valve position is corrected. Namely, the deviation of the actual vehicle speed $V_A$ (detected by the vehicle speed sensor 73 after the initial pulse is output to the vacuum pump 58) from the target vehicle speed $V_T$ is calculated. To reduce the deviation, the correction pulses are supplied to the vacuum pump 58 (see the waveform for the vacuum pump 58 in FIG. 29), or the control valve 56 is opened intermittently, so as to correct the throttle valve position.

Further, at step S75, the feedback control of the throttle valve position is performed. Namely, the vacuum pump 58 is supplied with feedback pulses or the control valve 56 opened intermittently (see the waveforms for the vacuum pump 58 and the control valve 56 in FIG. 29) to adjust the throttle valve position such that the actual vehicle speed $V_A$ detected by the vehicle speed sensor 73 is controlled to the target vehicle speed $V_T$. The feedback control is performed, for example, in accordance with the well-known PID (proportional plus integral plus differential) control method.

At step S76, it is judged whether or not there is an occurrence of failure. Namely, it is judged whether or not the vehicle speed control has become infeasible due to an occurrence of failure in, for example, the throttle valve driving system. If the judgement Is affirmative at step S76, the execution proceeds to step S77, where the procedure tc deal with the occurrence of failure is performed. Namely, the control valve 56 and the release valve 57 are opened such that the throttle valve 5 is urged by the return spring 19 to the idle position and the safety of the driver is ensured.

On the other hand, if the judgement is negative at step S76, the execution proceeds to step S78, where it is judged whether or not the automatic cruising control is to be released. When an operation of the brake is detected from the output of the brake switch 154, or when the release of the automatic cruising control is instructed via the release switch 153, the judgement is affirmative at step S78, If the Judgement is negative at step S78, the execution returns to step S75 to repeat the step S75 through S78, On the other hand, if the judgement is affirmative at step S78, the execution proceeds to step S78, where the automatic cruising control is released. Namely, the control valve 56 and the release valve 57 are opened such that the throttle valve 5 is urged by the return spring 19 to the idle position. After step S79, the execution returns to step S71, where the execution sits on a loop waiting for the next commencement of the automatic cruising control.

The above automatic cruising control device of FIG. 26, however, has the following disadvantage. Although the throttle valve 5 is driven toward the opening direction by the vacuum actuator 55 and hence the "open failure" of the throttle valve due to an occurrence of failure in the vacuum actuator 55, the control valve 56, and the release valve 57 is rare, the throttle valve 5 is returned to the idle position solely by the action of the return spring 19. When the automatic cruising control is to be released, the control valve 56 and the release valve 57 are opened to release the negative pressure within, such that the throttle valve 5 is closed by the action of the return spring 19. Thus, if the shaft of the throttle valve 5 or the throttle link 50 is stuck upon biting in a foreign material into the mechanical driving parts thereof, the urging force of the return spring 19 may prove insufficient for returning the throttle valve 5 to the idle position. Then, the rpm of the engine may rise unduely against the intention of the driver. The vehicle may thus run out of control and present a grave danger to the safety of the driver.

SUMMARY OF THE INVENTION

It is therefore sn object of this invention to provide a vehicle control device which provides the "limp home" function upon an occurrence of a failure in the driving or the control system of the throttle valve, wherein the output power of the engine can be controlled by means of the acceleration pedal without the manual attachment of auxiliary operating members to the throttle valve system. A further object of this invention is to provide such a vehicle control device by which the "limp home" function is provided even when the throttle valve is stuck near or at the fully closed position, and, further, the rpm and the output power of the engine can be controlled under an appropriate level in accordance with the driver's intention even when the throttle valve is stuck near or at the fully open position. Further, this invention aims at providing such a vehicle control device having the automatic cruising control capability.

The above objects are accomplished in accordance with this invention by a vehicle control device for controlling an output power of a multi-cylinder engine which includes: acceleration pedal position sensor means for detecting a position of an acceleration pedal, the acceleration pedal position sensor means generating an output corresponding to the position of the acceleration pedal; a throttle valve, disposed in an air-intake pipe coupled to the engine, for regulating an amount of air-intake into the engine; failure detector means for detecting an occurrence of a failure in a part associated with the throttle valve; and control means for controlling an operation of the multi-cylinder engine, wherein the control means is coupled to the acceleration pedal position sensor means and the failure detector means, and, when the failure detector means detects an occurrence of a failure, disables some of cylinders of the multi-cylinder engine in accordance with the output of the acceleration pedal position sensor means. Preferably, the vehicle control device further includes: throttle position sensor means for detecting a throttle valve position of the throttle valve, the throttle position sensor means generating an output corresponding to the throttle valve position; wherein the control means is further coupled to the throttle position sensor means and, when the failure detector means detects an occurrence of a failure, disables some of cylinders of the multi-cylinder engine in accordance with outputs of the acceleration pedal position sensor means and the throttle position sensor means.

Further, it is preferred that the vehicle control device further includes: a bypass control valve disposed in a bypass pipe bypassing the air-intake pipe; wherein when the failure detector means detects an occurrence of a failure, the control means further controls a position of the bypass control valve in accordance with outputs of the acceleration pedal position sensor means and the throttle position sensor means. Furthermore, it is preferred that the vehicle control device further includes: engine rotational speed sensor means for detecting an engine rotational speed of the engine; wherein the control means is further coupled to the engine rotational speed sensor means, and, when the failure detector means detects an occurrence of a failure and the engine rotational speed detected by the engine rotational speed sensor means exceeds a predetermined level, performs a fuel cut control of the engine. Still further, it is preferred that the vehicle control device further includes: transmission detector means for detecting a mode of a transmission which transmits a torque of the engine to road wheels of a vehicle, the transmission detector means generating an output indicating whether or not the torque of the engine is transmitted to the road wheels; wherein the control means is further coupled to the transmission detector means, and, (1) when the failure detector means detects an occurrence of a failure and the output of the transmission detector means indicates that the torque of the engine is transmitted to the road wheels, disables the cylinders in accordance with a first predetermined relation between a number of disabled cylinders and the outputs of the acceleration pedal position sensor means and the throttle position sensor means, and (2) when the failure detector means detects an occurrence of a failure and the output of the transmission detector means indicates that the torque of the engine is not transmitted to the road wheels, the control means disables the cylinders in accordance with a second predetermined relation between a number of disabled cylinders and the outputs of the throttle position sensor means.

It is further preferred that the vehicle control device further includes: vehicle speed sensor means for detecting a vehicle speed of a vehicle driven by the engine; and automatic cruising control means, coupled to the vehicle speed sensor means, for controlling the vehicle speed detected by the vehicle speed sensor means to a target vehicle speed, wherein the automatic cruising control means includes the failure detector means and detects an occurrence of a failure when automatic cruising control becomes infeasible. The automatic cruising control means may detect an occurrence of a failure when a deviation of the vehicle speed detected by the vehicle speed sensor means from target vehicle speed exceeds a predetermined level.

It is further preferred that the vehicle control device further includes: throttle actuator means for controlling the position of the throttle valve to a target throttle valve position; wherein the failure detector means is coupled to the throttle actuator means and the throttle position sensor means, and detects an occurrence of a failure when a deviation of the throttle valve position detected by the throttle position sensor means from the target throttle valve position exceeds a predetermined level. Further, the vehicle control device may includes: a bypass control valve disposed in a bypass pipe bypassing the air-intake pipe; wherein, when the failure detector means detects an occurrence of a failure, the control means further controls a position of the bypass control valve in accordance with the output of the acceleration pedal position sensor means. Furthermore, the vehicle control device may include: an automatic transmission which transmits a torque of the engine to road wheels of a vehicle at a plurality of transmission ratios; wherein, when the failure detector means detects an occurrence of a failure, the control means further controls the transmission ratio of the automatic transmission in accordance with the output of the acceleration pedal position sensor means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 2a shows the relation between the output level of the throttle position sensor and the disabling level (i.e., the number of disabled cylinders), during the time when the vehicle is stopped (i.e., when the automatic transmission is in the neutral or the parking mode);

FIG. 2b shows the disabled cylinder numbers for respective disabling level;

FIG. 2c shows the fuel cut zone plotted on the plane of the coolant water temperature and the rpm of the engine;

Figure 26:
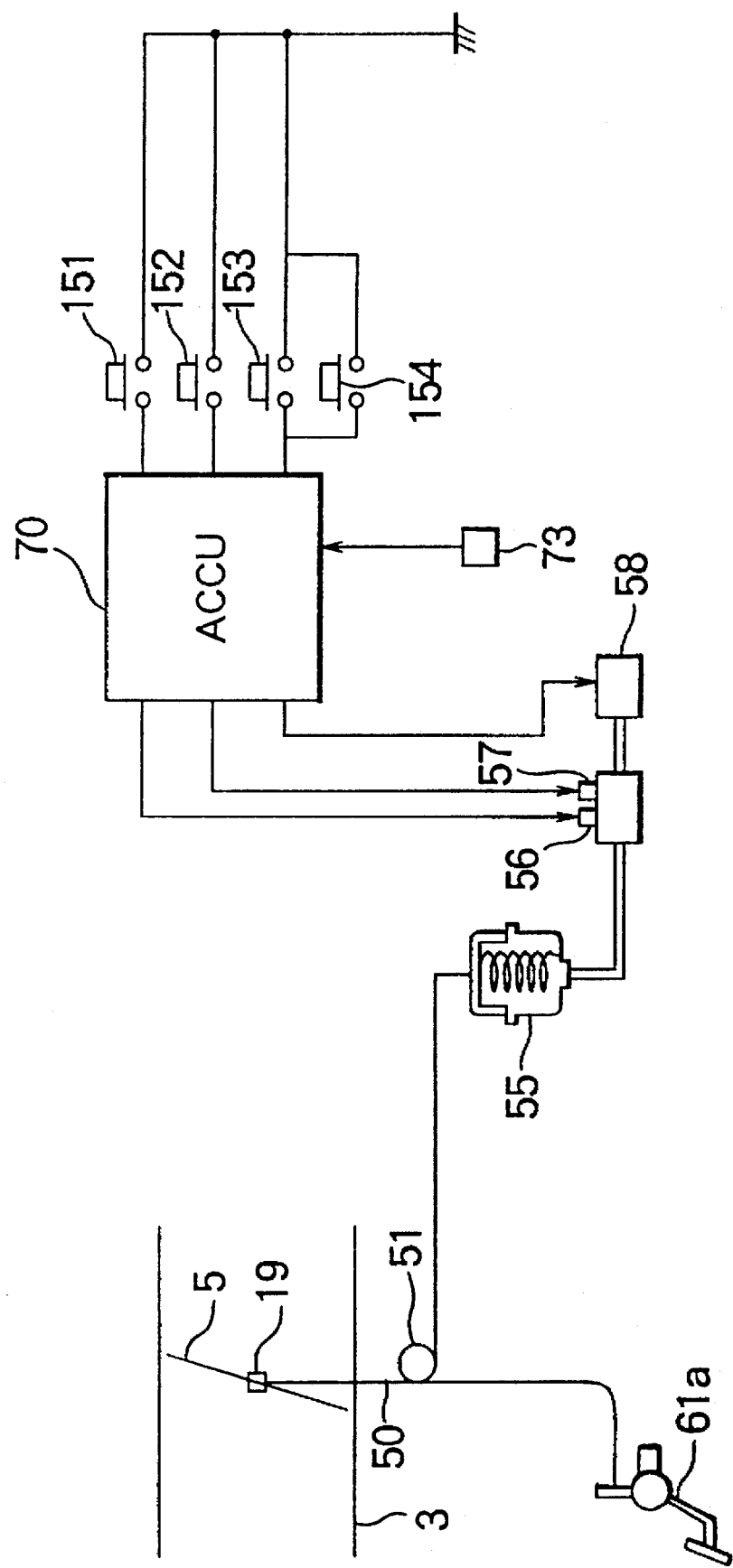
FIG. 26 is a block diagram showing the overall structure of a conventional automatic cruising control unit.
Figure 28A:
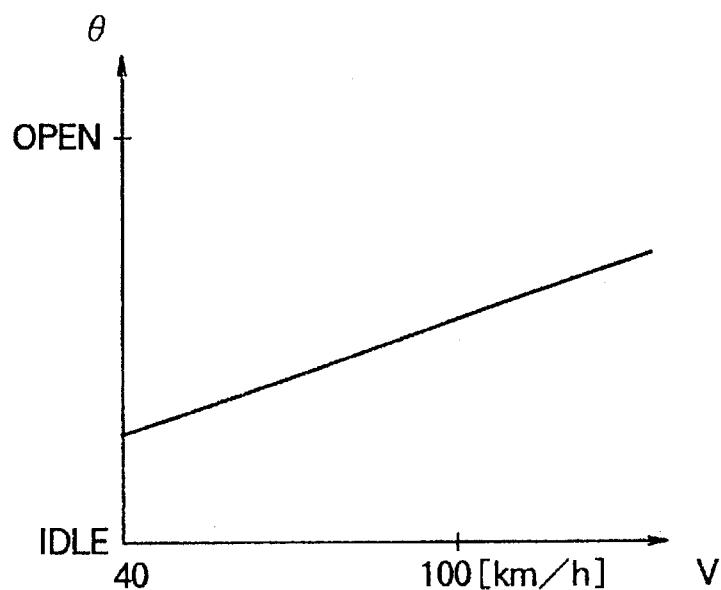
Figure 28B:
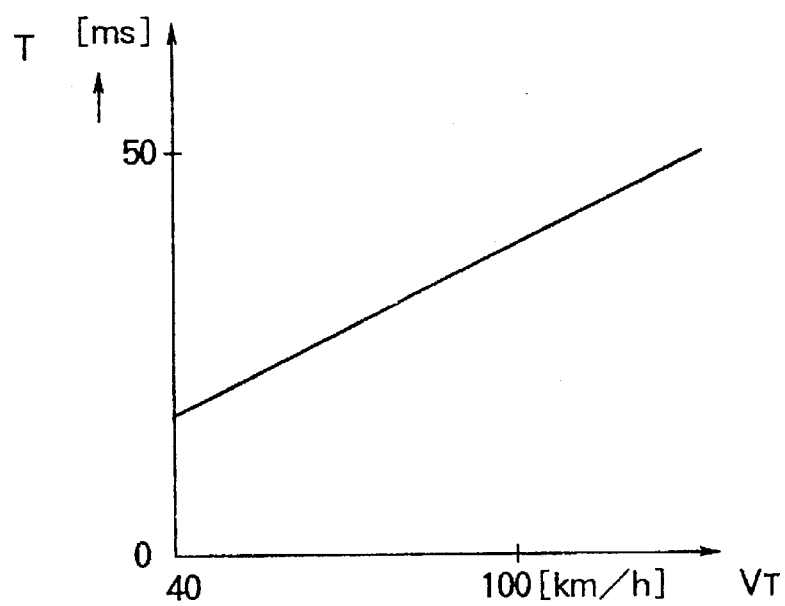
Figure 29:
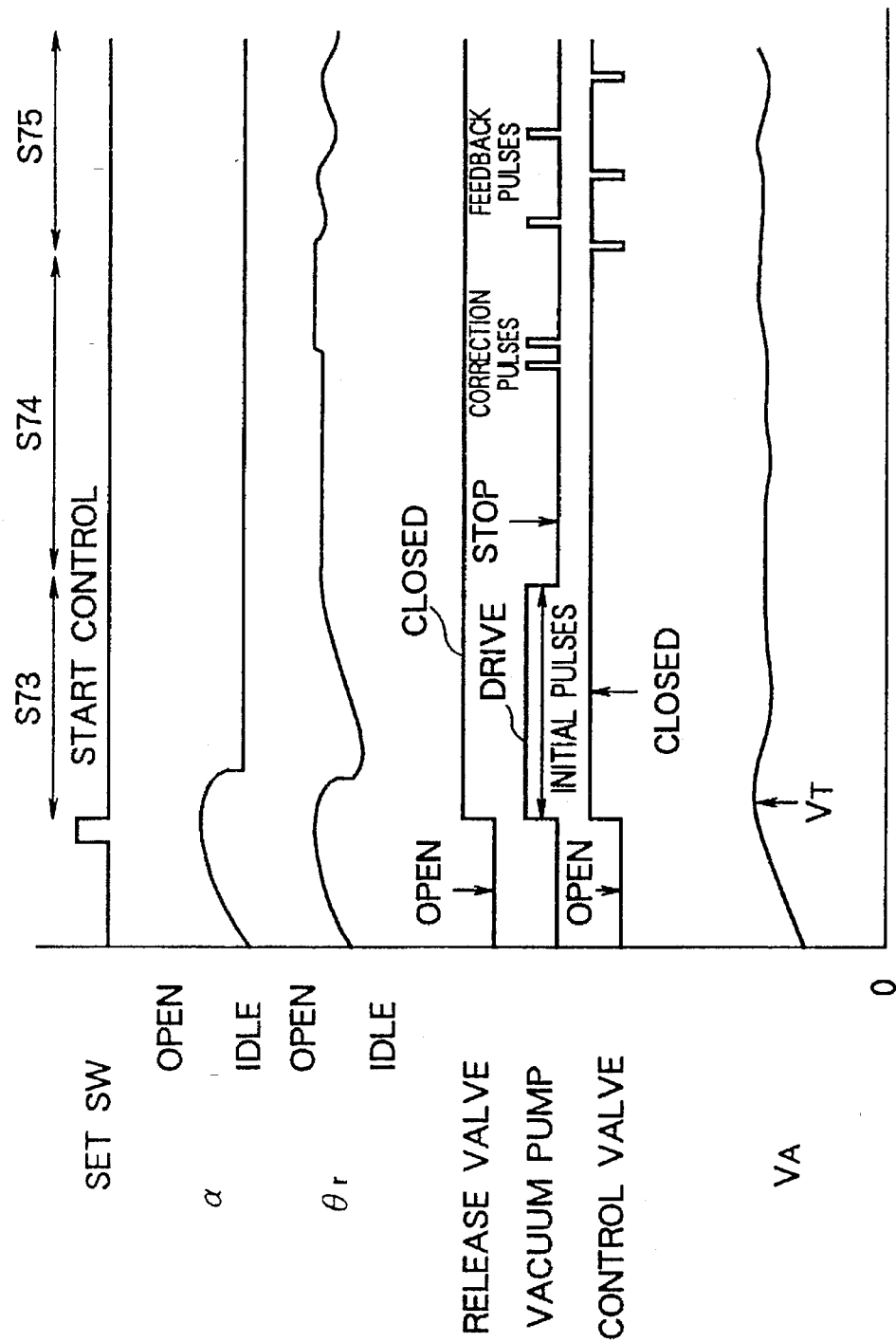

FIG., 27 is a flowchart showing the automatic cruising control operation of the automatic cruising control unit of FIG. 26;

FIG. 28a shows the relation between the vehicle speed V and the initial position θ of the throttle valve for maintaining the vehicle speed V;

FIG. 28b shows the relation between the target vehicle speed $V_T$ and the drive time T of the vacuum pump for attaining the initial throttle valve position θ as required by the relation of FIG. 28a;

FIG. 29 is a timing chart showing waveforms of various signals generated in the vehicle control device of FIG. 26 during the automatic cruising control procedure.

In the drawings, like reference numerals represent like or corresponding parts or portions.

DETAILED DESCRIPTION OF THE PREFERRED EMBODIMENTS

Figure 1:
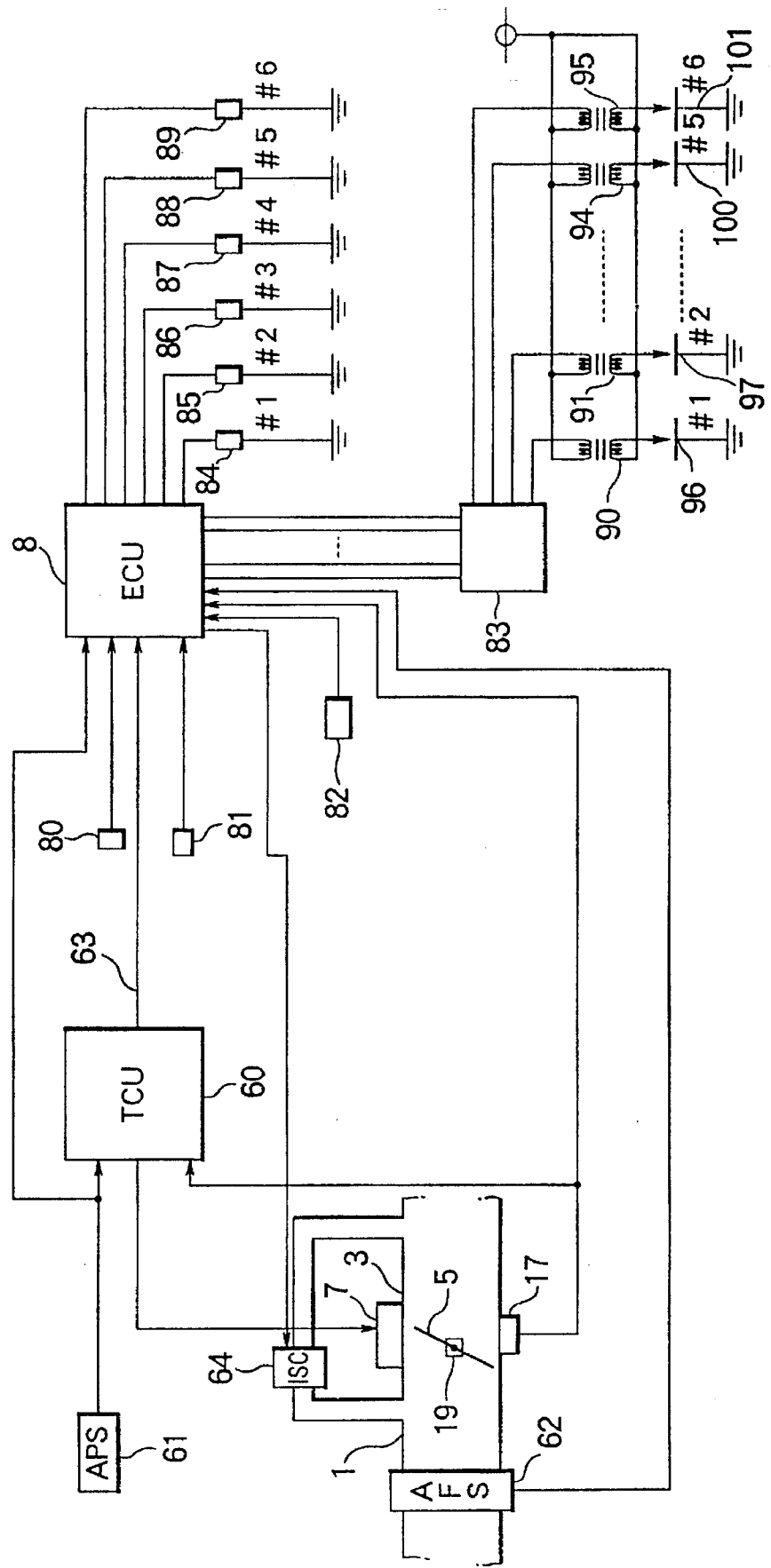
FIG. 1 is a block diagram showing the overall structure of the vehicle control device according to this invention for controlling the engine upon occurrence of a failure.

Referring now to the accompanying drawings, the preferred embodiments of this invention are described, FIG. 1 is a block diagram showing the overall structure of the vehicle control device according to this invention for controlling the engine upon occurrence of a failure. The figure shows the vehicle control device for a six-cylinder engine mounted on a vehicle provided with an automatic transmission. In FIG. 1, the parts for controlling the throttle valve includes: a throttle valve control unit 60; an acceleration pedal position sensor 61 for detecting the kick depth of the acceleration pedal; a throttle valve 5 disposed within the air-intake pipe 3, which is driven by a throttle actuator 7 and urged to the idle position by the return spring 19; and a throttle position sensor 17 for detecting the position of the throttle valve. On the other hand, the parts for controlling the engine includes: an airflow sensor 62 for measuring the amount of the air-intake into the engine; a crank angle sensor 82 for detecting the position of the crankshaft and the rpm of the engine; an inhibitor switch 80 by which the neutral (N) and the parking (P) modes of the automatic transmission are detected; a water temperature sensor 81 for detecting the temperature of the coolant water of the engine; injectors 84 through 89 for respective cylinders #1 through #6 of the engine; an igniter 83 for turning on and off the current supply to the ignition coils 90 through 95 so as to ignite the ignition plugs 96 through 101 of the respective cylinders #1 through #6; end a bypass control valve 64 (idling speed control valve) for controlling the amount of bypassed air during the idling period, etc. When the throttle valve becomes incapable of control, the throttle valve control unit 60 supplies a failure signal 63 to the engine control unit 8 to notify an occurrence of a failure.

Figure 7:
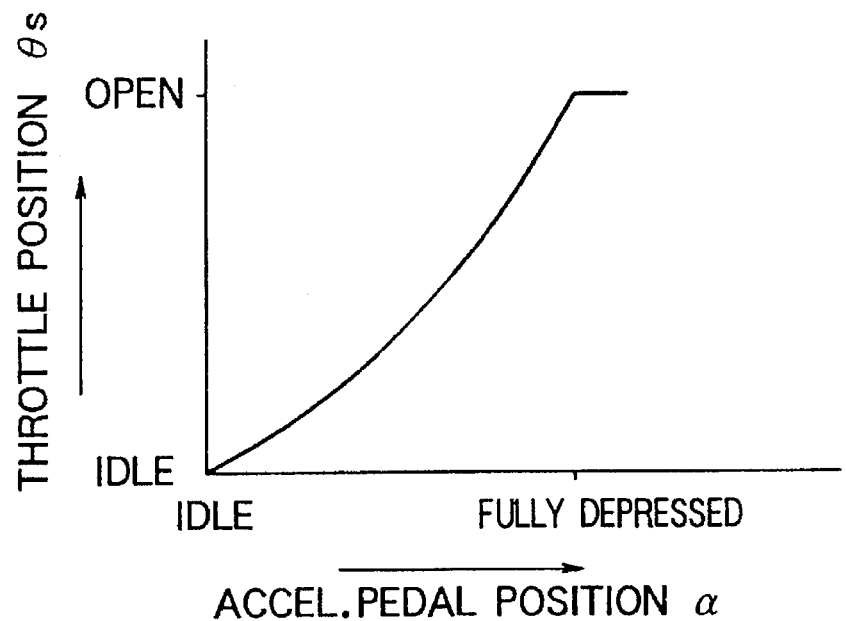
FIG. 7 shows an exemplary curve representing the relationship between the acceleration pedal position α and the target throttle valve position θs.

Next the operation of the parts for controlling the throttle valve is described. The throttle valve control unit 60 operates the throttle actuator 7 in accordance with the kick depth of the acceleration pedal detected by the acceleration pedal position sensor 61 and thereby adjusts the position of the throttle valve 5. The control is performed, for example, in accordance with the well-known PID (proportional plus integral plus differential) closed loop control method, detecting the position of the throttle valve 5 by means of the throttle position sensor 17. FIG. 7 shows an exemplary curve representing the relationship between the acceleration pedal position α and the target throttle valve position θs.

When the throttle valve 5 becomes incapable of being controlled due to an occurrence of failure in the throttle actuator 7 or in the driving system of the throttle valve 5, the throttle valve control unit 60 detects the failure, stops driving the throttle actuator 7, and supplies the failure signal 63 to the engine control unit 8 to notify an occurrence of the failure.

Under the normal condition, the engine control unit 8 measures the amount of air-intake taken into the engine by means of the airflow sensor 62, determines the rpm and the crank angle of the engine by means of the crank angle sensor 82, and drives the injectors 84 through 89 to supply the fuel to the respective cylinders #1 through #6 on the basis thereof. Further, the engine control unit 8 controls the igniter 83, the ignition coils 90 through 95, and the ignition plugs 96 through 101 to ignite the respective cylinders #1 through #6.

When the throttle valve becomes incapable of control, the engine control unit 8 adjusts (or cuts down) the amount of air-intake through the bypass control valve 64 on the basis of the failure signal 63, so as to control the output power of the engine.

Figure 8:
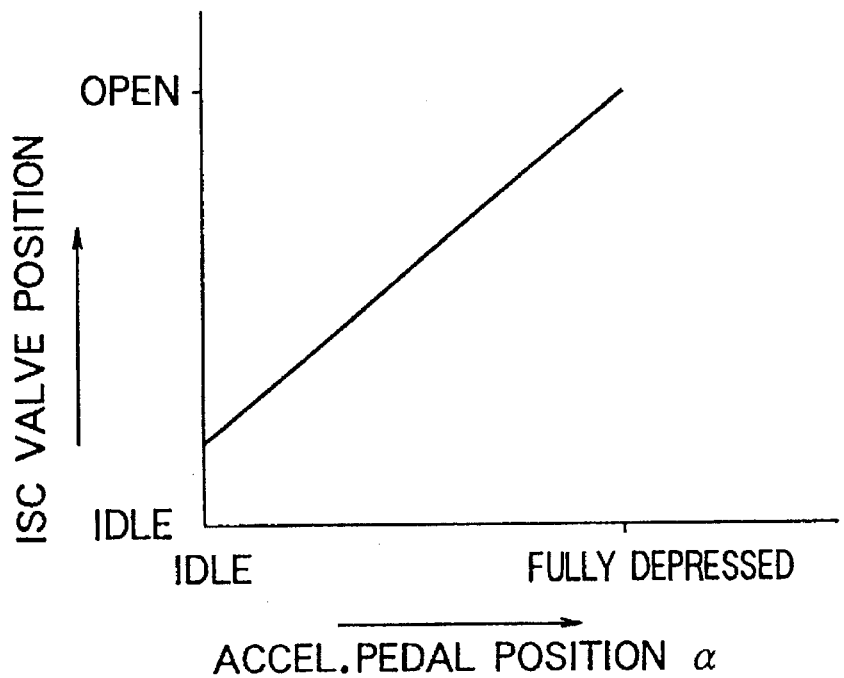
FIG. 8 shows an exemplary curve representing the relationship between the acceleration pedal position α and the position of the bypass control valve (idling speed control valve)

Next the "limp home" function of the vehicle control device of FIG. 1 is described. When the throttle valve becomes incapable of control, the throttle valve control unit 60 turns off the current supply to the throttle actuator 7, such that the throttle valve 5 is urged toward the idle position by the return spring 19. However, the shaft of the throttle valve may be mechanically locked by the locking of the electric motor of the throttle actuator 7. Then, the throttle shaft 13 is fixed at the position upon the occurrence of the failure. If the throttle valve ls at or near the idle position upon occurrence of the failure, the position of the bypass control valve 64 is controlled in proportion to the depression of the acceleration pedal (the kick depth of the acceleration pedal). FIG. 8 shows an exemplary curve representing the relationship between the acceleration pedal position α and the position of the bypass control valve (idling speed control valve). The "limp home" function is thus provided by controlling the position of the bypass control valve 64 in response to the position of the acceleration pedal as described below.

Figure 3:
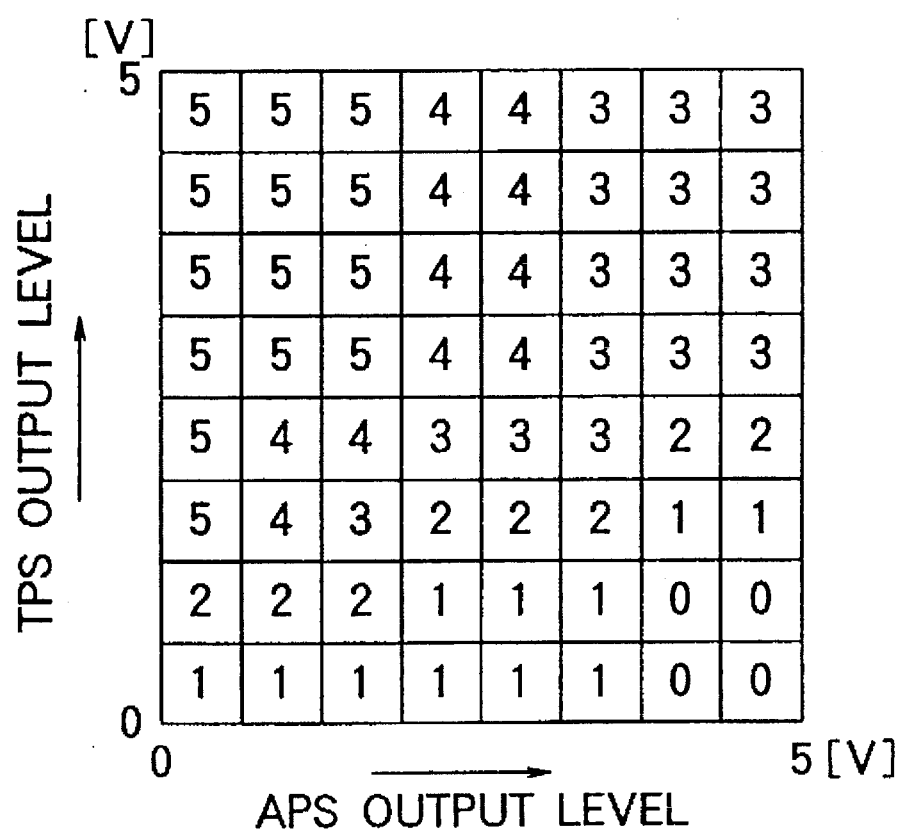
FIG. 3 is a mapping table showing the disabling level (i.e., the number of disabled cylinders) for the respective output levels of the acceleration pedal position sensor and the throttle position sensor, during the time when the vehicle is driven (i.e., when the automatic transmission is in the first, the second, the drive or the reverse gear ratio mode)

If, however, the throttle valve is fixed at a position where the opening of the throttle valve is greater than a predetermined level, some of the cylinders #1 through #6 are disabled to provide the "limp home" function. Namely, the supply of the fuel and the ignition of the disabled cylinders are stopped to reduce the output power of the engine to a level sufficient for providing the "limp home" function. FIG. 3 is a mapping table showing the disabling level (i.e., the number of disabled cylinders) for the respective output levels of the acceleration pedal position sensor and the throttle position sensor, during the the when the vehicle is driven (i.e., when the automatic transmission is at the first, the second, the drive or the reverse gear ratio position). On the other hand, FIG. 2a shows the relation between the output level of the throttle position sensor and the disabling level (i.e., the number of disabled cylinders), during the time when the vehicle is stopped (i.e., when the automatic transmission is in the neutral or the parking mode). FIG. 2b shows the disabled cylinder numbers for respective disabling level. For example, cylinders #1, #3, and #5 are disabled at the cylinder disabling level 3.

Thus, assure, for example, that the throttle valve is fixed between the fully open and the half open position upon an occurrence of a failure when the vehicle is being driven. Then, as shown at the top four rows in the mapping table of FIG. 3, the disabling level (i.e., the number of disabled cylinders) is varied from five to three in accordance with the output voltage level of the acceleration pedal position sensor. When the throttle valve is fixed at a position narrower than the middle, the disabling level is varied from five to two (the fourth row from the bottom), from five to one (the third row from the bottom), from two to zero (the second bottom row), and from one to zero (the bottom row) in accordance with the fixed position of the throttle valve (indicated by the output level of the throttle position sensor 17) and the kick depth of the acceleration pedal (indicated by the output level of the acceleration pedal position sensor 61). Thus, the driver can control the output power of the engine appropriately by adjusting the kick depth of the acceleration pedal while the vehicle is driven to a nearby garage.

When the vehicle is stopped and the gear of the automatic transmission is changed to the neutral or the parking position, the position of the automatic transmission is detected by the inhibitor switch 80 and the disabling level is controlled in accordance with the relation shown in FIG. 2a, to avoid the problems such as: (1) the variation of the idling rpm of the engine caused by the disabling of the cylinders immediately after the starting of the engine; and (2) the shock caused by the abrupt change in the rpm of the engine when the transmission ratio of the automatic transmission is shifted from the neutral (N) to the reverse (R) or from the neutral (N) to the driving (D) mode. Thus, when the automatic transmission is in the N or P position, the number of diasbled cylinders is determined exclusively by the output voltage level of the throttle position sensor 17. When the output level of the throttle position sensor 17 is in the lowest range, no cylinder is disabled. The disabling level rises as the output level of the throttle position sensor 17 increases, reaching level five when the throttle valve is fully open. The rotational speed of the engine may reach or exceed about 2000 to 3000 rpm even if the cylinders are disabled in accordance with the relation shown in FIG. 2a. If the rpm of the engine rises to such a high level and the automatic transmission is shifted from the neutral (N) to the reverse (R) or from the neutral (N) to the driving (D) mode, a severe shock may cause a malfunctioning of the engine. Thus, when the automatic transmission is in the neutral or the parking mode, the fuel supply is cut when the rpm of the engine exceeds a predetermined level.

FIG. 2c shows the fuel cut zone plotted on the plane of the coolant water temperature and the rpm of the engine. As shown in FIG. 2c, the fuel cut control is commenced (turned on) when the rpm of the engine rises into the zone above the curve ON, and is turned off when the rpm of the engine falls below the curve OFF. As shown in FIG. 2c, the rpa levels of the curves ON and OFF are higher in the low coolant water temperature range, in order to accommodate for the frictional power loss of the engine at the low temperature. The variation of the ON and OFF fuel cut rpm level with respect to the water temperature thus improves the driving performance while providing the "limp home" function.

Figure 4:
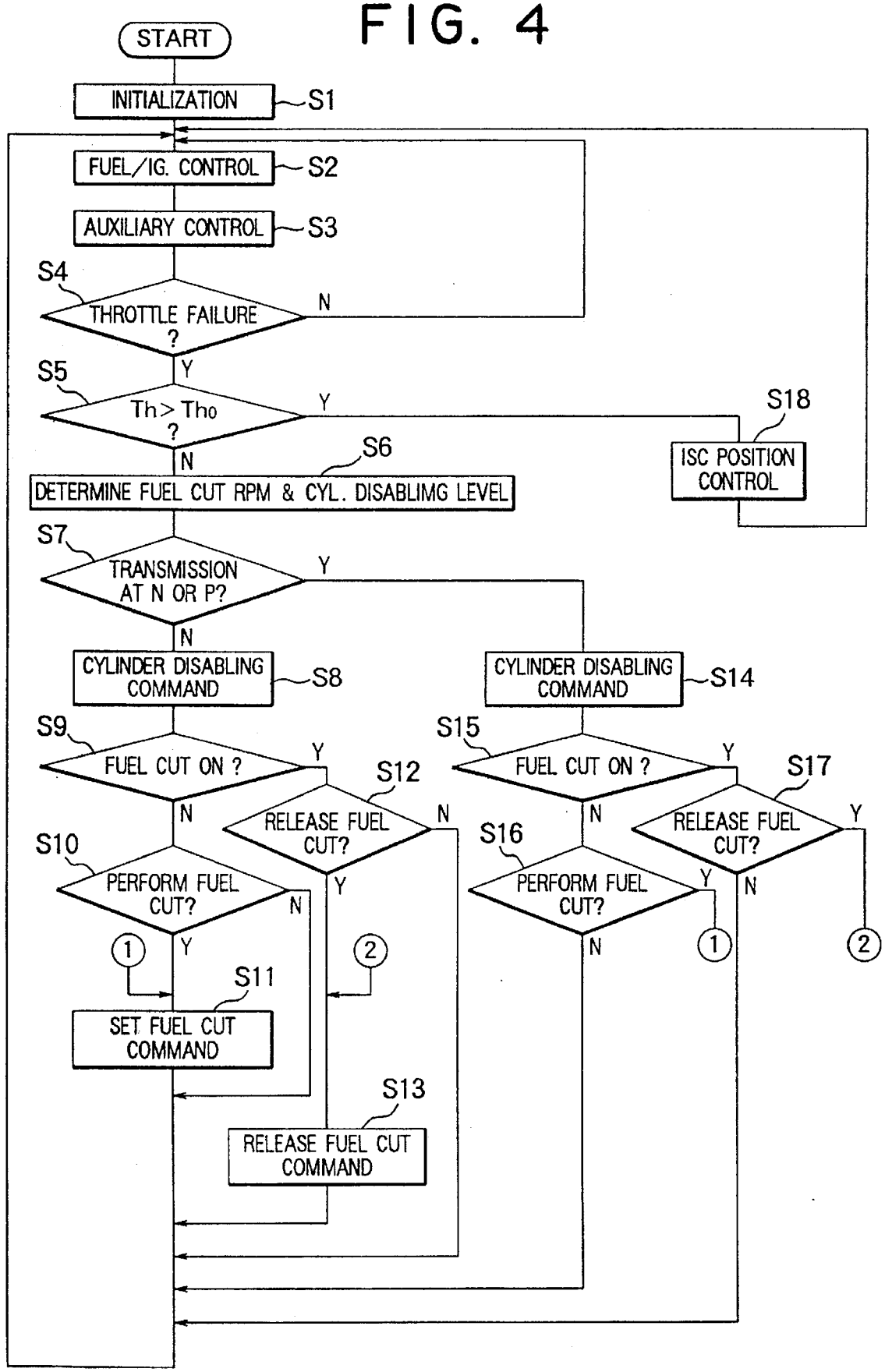
FIG. 4 is a flowchart showing the main routine followed by the microcomputer of the engine control unit 8 of FIG. 1.

FIG. 4 is a flowchart showing the main routine followed by the microcomputer of the engine control unit 8 of FIG. 1. At Step S1, the system is initialized immediately after the electrical system of the vehicle is turned on. Then the engine is started, and, at step S2, the fuel injection and the ignition of the respective cylinders of the engine are performed. Further at step S3, the auxiliary parts such as the bypass control valve 64 associated with the engine are controlled.

Next at step S4, the engine control unit 8 judges whether or not the throttle valve drive system is in failure. The judgment is based on the failure signal 63 from the throttle valve control unit 60. Namely, if the failure signal 63 is supplied from the throttle valve control unit 60 to notify an occurrence of a failure, the judgment is affirmative. Otherwise, the judgment is negative. If the judgement is negative at step S4 (i.e., if the throttle valve is not in failure), the execution returns to step S2 to repeat the steps S2 and S3. If the judgement is affirmative at step S4, the execution proceeds to step S5, where it is judged whether or not the throttle position Th is less than or equal to a predetermined level $Th_O$. If the judgement is affirmative at step S5 (i.e., if the throttle Th position is less than or equal to the predetermined reference level $Th_O$), the execution proceeds to step S18, where the bypass control valve 64 is controlled by the engine control unit 8 on the basis of the output level of the acceleration pedal position sensor 61, in accordance with the relationship shown in FIG. 8, to control the output power of the engine in accordance with the in tension of the driver. After step 818, the execution returns to step S2, to repeat the steps S2 through S5 and step S18.

On the other hand, if the judgement is negative at step S5, the execution proceeds tp step S6, where the rpm of the engine at which the fuel supply to the engine ks to be cut and the cylinder disabling level may be preliminarily determined. When the automatic transmission is in the N or the P mode the fuel cut rpm the engine is determined in accordance with the relation exemplified by the curve ON shown in FIG. 2c. When, on the other hand, the automatic transmission is not in the N or the P mode, a predetermined rpm level, e.g., 4000 rpm, is used as the fuel cut rpm of the engine, such that the output power of the engine may not become too great. Further, when the automatic transmission is in the N or P, the cylinder disabling level is determined in accordance with the relation shown in FIG. 2a. Otherwise, the cylinder disabling level is determined in accordance with the relation shown in the mapping table of FIG. 3. Next at step S7, it is judged whether or not the shift lever position of the automatic transmission is at the N or the P position.

If the judgement is negative at step S7 (i.e., the automatic transmission is at the forward or reverse drive gear range), the execution proceeds to step S8 to execute the steps S8 through S13. At step S8, the cylinder disabling level as determined from the map of FIG. 3 is set as the cylinder disabling level command. Next at step S9, it is judged whether or not the fuel cut is being performed. If the judgement is affirmative at step S9, the execution proceeds to step S12, where it is judged whether or not the fuel cut is to be released. Namely, at step S12, it is judged whether or not the rpm of the engine is less than or equal to a predetermined release level 3900 rpm which is 100 rpa less than the fuel cut turn-on level 4000 rpm, to provide a hysteresis characteristic. If the judgement is affirmative at step S12, the execution proceeds to step S13, where the fuel cut command is reset (i.e., the fuel cut control is released). After step S13, the execution returns to step S2. If the judgement is negative at step S12, the execution returns directly to step S2. On the other hand, if the judgement is negative at step 39, the execution proceeds to step S10, where it is judged whether or not the fuel cut is to be performed. If the rpm of the engine is greater than or equal to the predetermined fuel cut turn-on level, 4000 rpm, the fuel cut command is set at step S11 and the execution returns to step 52 If the judgement is negative at step S10, the execution returns directly to step S2.

If the judgement is affirmative at step S7 (i.e., if the automatic transmission is at the N or P gear position), the execution proceeds to step 814 to execute the steps S14 through S17. At step S14, the cylinder disabling level is determined in accordance with the relation shown in FIG. 2a and the corresponding cylinder disabling command is set. Next at step S15, it is judged whether or not the fuel cut is being performed. If the judgement is affirmative at step S15, the execution proceeds to step S17, where it is judged whether or not the fuel cut is to be released. Namely, at step S17 it is judged whether or not the rpm of the engine is less than or equal to the release level represented by the curve OFF in FIG. 2c. The curve OFF is less than the curve ON by 100 rpm to provide for a hysteresis characteristic. If the judgement is affirmative at step S17, the execution proceeds to step S13, where the fuel cut command is released. If the Judgement is negative at step S17, the execution returns directly to step S2. If the judgement is negative at step S15, the execution proceeds to step S16, where it is Judged whether or not the fuel out is to be performed. Namely, at step S16, it is judged whether or not the rpm of the engine is greater than or equal to the fuel cut turn-on level represented by the curve ON in FIG. 2c. If the judgement is affirmative at step S16, the execution proceeds to step where the fuel cut command is set. If the judgement is negative at step S16, the execution returns directly to step S2.

Figure 5:
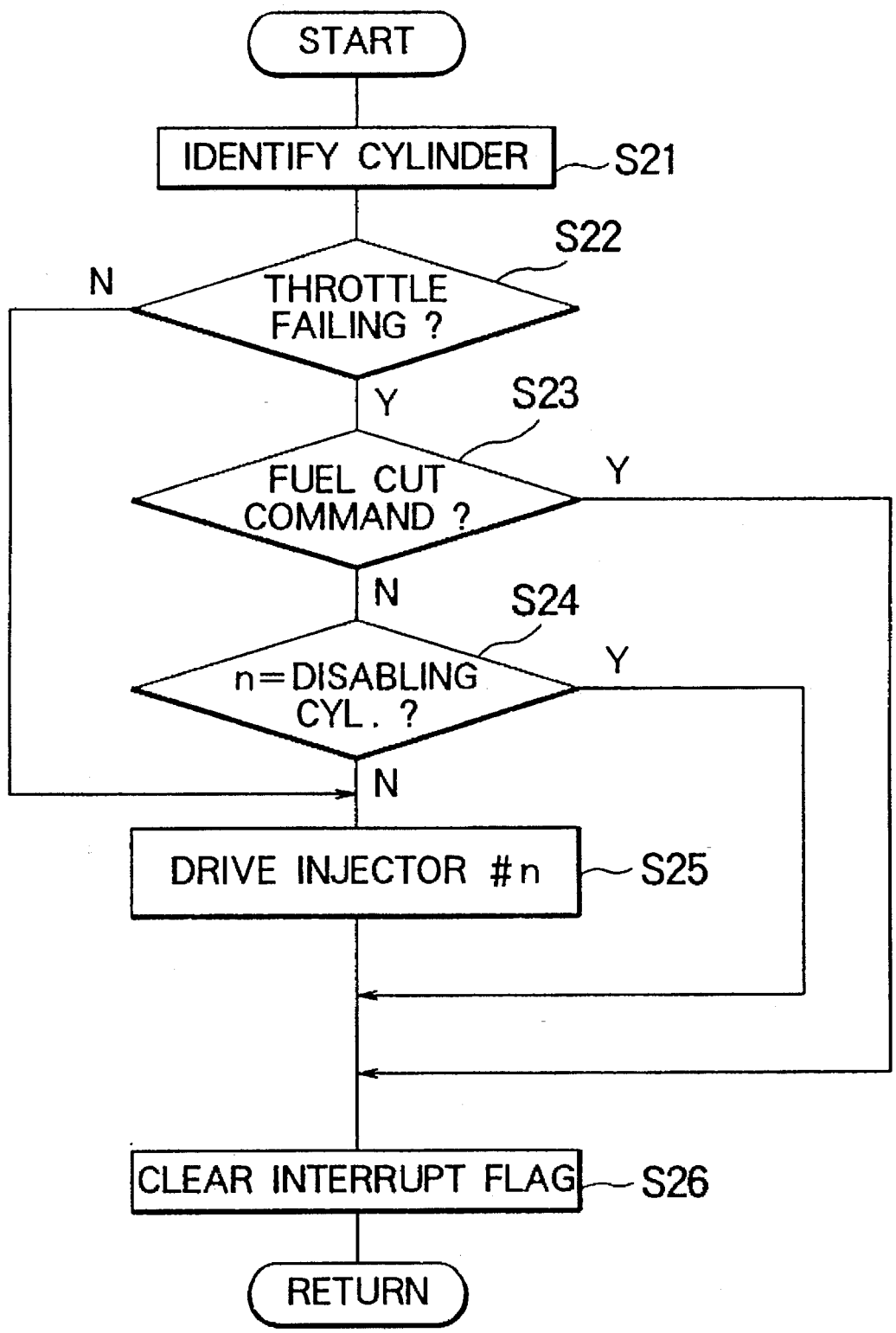
FIG. 5 is a flowchart showing the fuel injection routine followed by the microcomputer of the engine control unit 8 of FIG. 1.
Figure 6A:
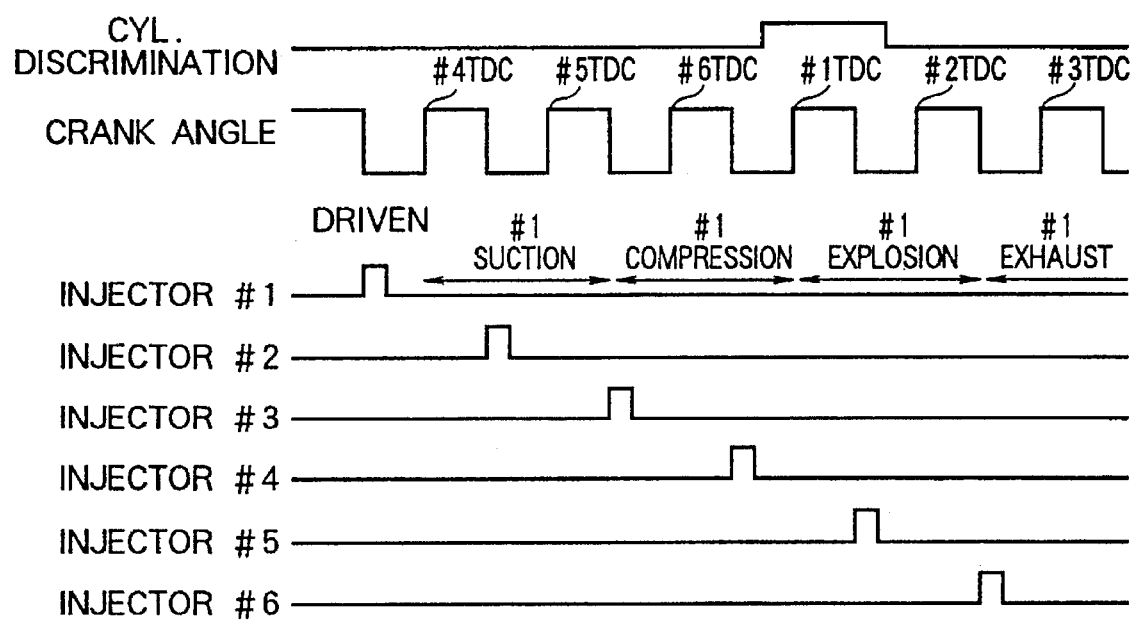
FIG. 6a is a timing chart showing the relation between the crank angle and the normal fuel injection timings of cylinders #1 through #6.
Figure 6B:
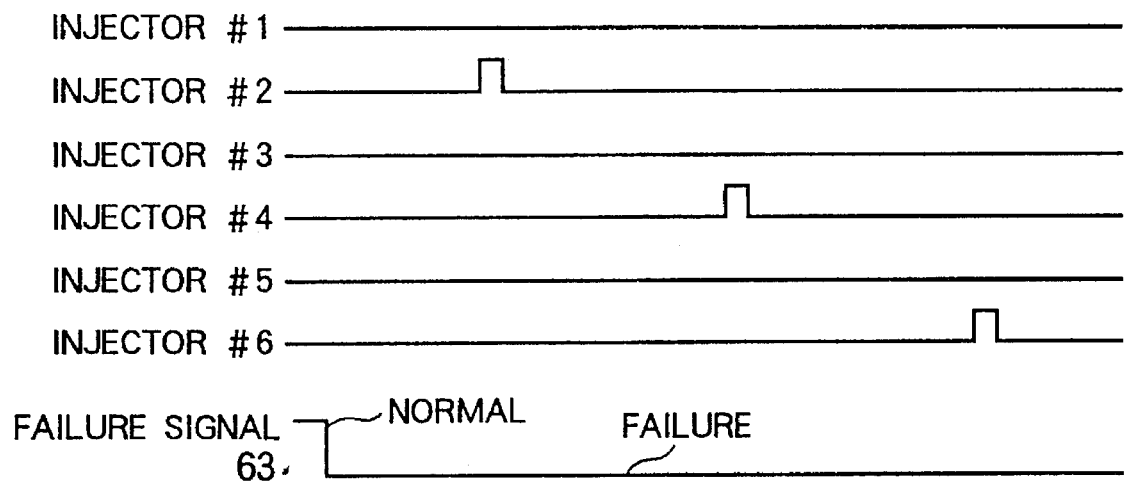
FIG. 6b is a timing chart similar to that of FIG. 6a, but showing the fuel injection timings where the cylinders #1, #3, and #5 are disabled.

FIG. 5 is a flowchart showing the fuel injection routine followed by the microcomputer of the engine control unit 8 of FIG. 1. The routine of FIG. 5 performs the fuel injection control at step S2 of FIG. 4. FIG. 6a is a timing chart showing the relation between the crank angle and the normal fuel injection timings of cylinders #1 through #6. FIG. 6b is a timing chart similar to that of FIG. 6a, but showing the fuel injection timings where the cylinders #1, #3, and #5 are disabled.

In FIG. 6a, each pulse of the cylinder discrimination signal (the top waveform) identifies the pulse of the crank angle signal (the second waveform) corresponding to cylinder #1. The rising edge of the pulses of the crank angle signal represents the top dead center (TDC) between the compression and the explosion stroke of respective cylinders. Normally, the injectors for respective cylinders #1 through #6 are driven successively at the suction stroke of respective cylinders #1 through #6. The drive signals for the respective injectors are shown by six lower waveforms in FIG. 6a. These drive signals for the injectors are generated by an interrupt routine of FIG. 5 which is started at each rising edge of the crank angle signal.

When the routine of FIG. 5 is started, the cylinder corresponding to the current pulse of the crank angle signal is identified at step S21. As described above, the pulse of the cylinder discrimination signal is generated in synchronisa with the pulse of the crank angle signal corresponding to cylinder #1. Thus, the successive cylinders #1 through #6 can be identified by incrementing a cylinder number n in a counter for storing the cylinder number. Next, at step S22, it is judged whether or not the throttle valve drive system is in failure. If the judgement is negative at step S22, the execution proceeds to step S25, where the injector for the current cylinder No. n is driven. On the other hand, if the judgement is affirmative at step S22, the execution proceeds to step S23, where it is judged whether or not the fuel cut command is set at step 811 in the routine of FIG. 4. If the fuel cut command is set, the execution proceeds direct to step S26, where the interrupt flag for the routine of FIG. 5 is cleared, and the execution returns to the main routine of FIG. 4. On the other hand, if the judgement is negative at step S23, the execution proceeds to step S24, where it is judged whether or not the current cylinder number n is equal to one of the disabled cylinders. Namely, the disabled cylinders are determined on the basis of the cylinder disabling level command (which is set at step S8 or step S14 in the routine of FIG. 4) and the relation shown in FIG. 2b. If the current cylinder number n is contained in the set of disabled cylinders, then, the current cylinder should be disabled. Thus, if the judgement is affirmative at step S24, the execution proceeds directly to step S26 to return to the main routine without fuel injection. On the other hand, if the judgement is negative at step S24, the execution proceeds to step S25, where the injector for the current cylinder No. n is driven and, after clearing the interrupt flag at step S26, the execution returns to the main routine.

Assume that the cylinder disabling level is three. Then, as shown in FIG. 2b, the cylinders No. 1, 3 and 5 are disabled. Under such circumstances, the step S25 is performed only for the cylinders No. 2, 4 and 6, since the judgment at step S24 is affirmative for n=1, 3 and 5. The drive signals for the injectors for such case are shown in FIG. 6b, where the bottom curve shows the waveform of the failure signal 63. In FIG. 6b, it is assumed that the low level of the failure signal 63 represents an occurrence of a failure in the throttle valve drive system. By the way, the pulse width of the drive signals for respective injectors is set by a timer within the engine control unit 8, such that the injectors are driven for a predetermined length of time.

FIG. 1 shows the case where the principle of this invention is applied to a low voltage distribution type vehicle with a six-cylinder engine. This invention, however, is applicable to a high voltage distribution type vehicle, with, for example, eight- or twelve-cylinder engine.

Figure 9:
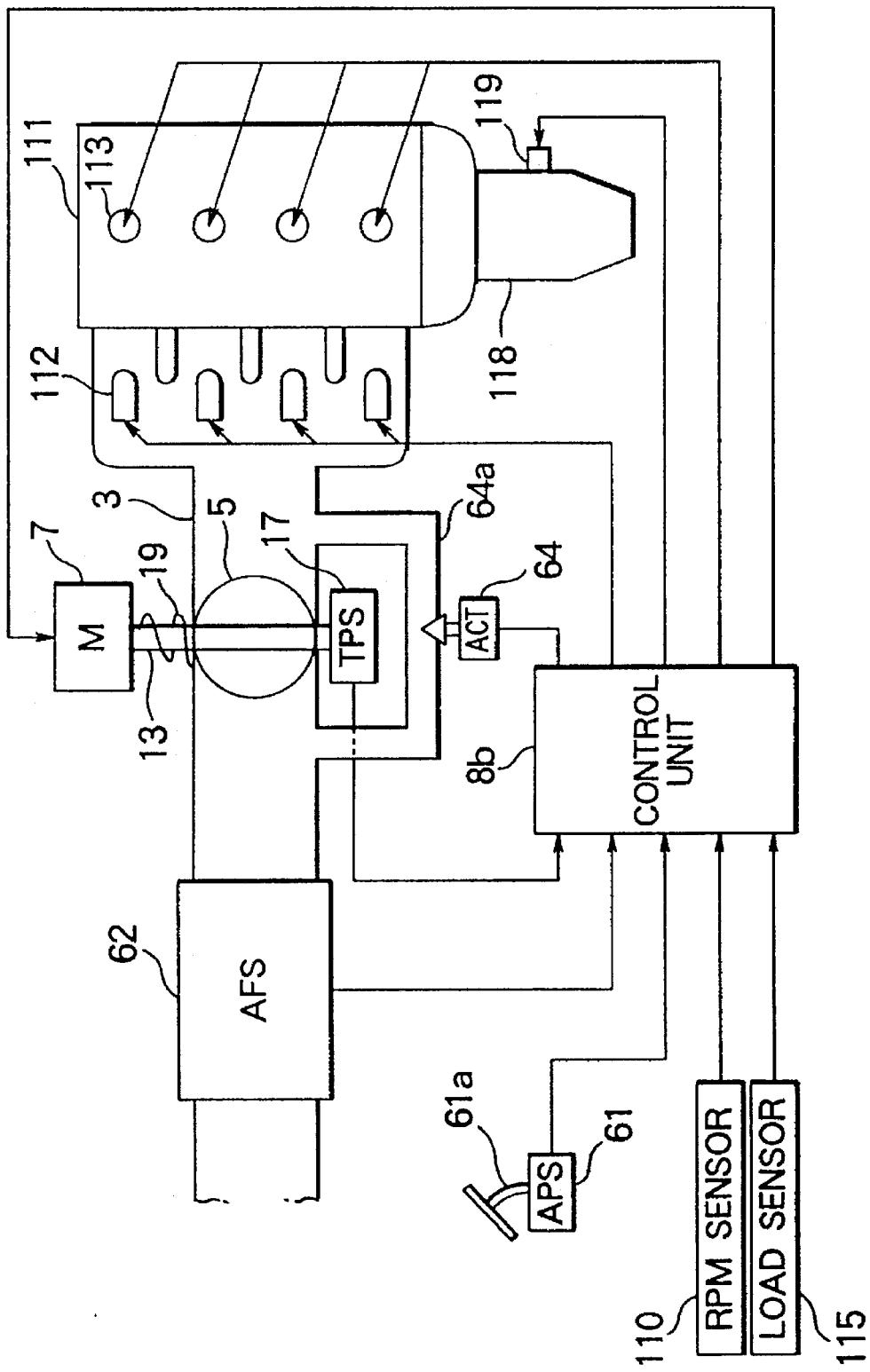
FIG. 9 is a block diagram showing the overall structure of another vehicle control device according to this invention.
Figure 21:
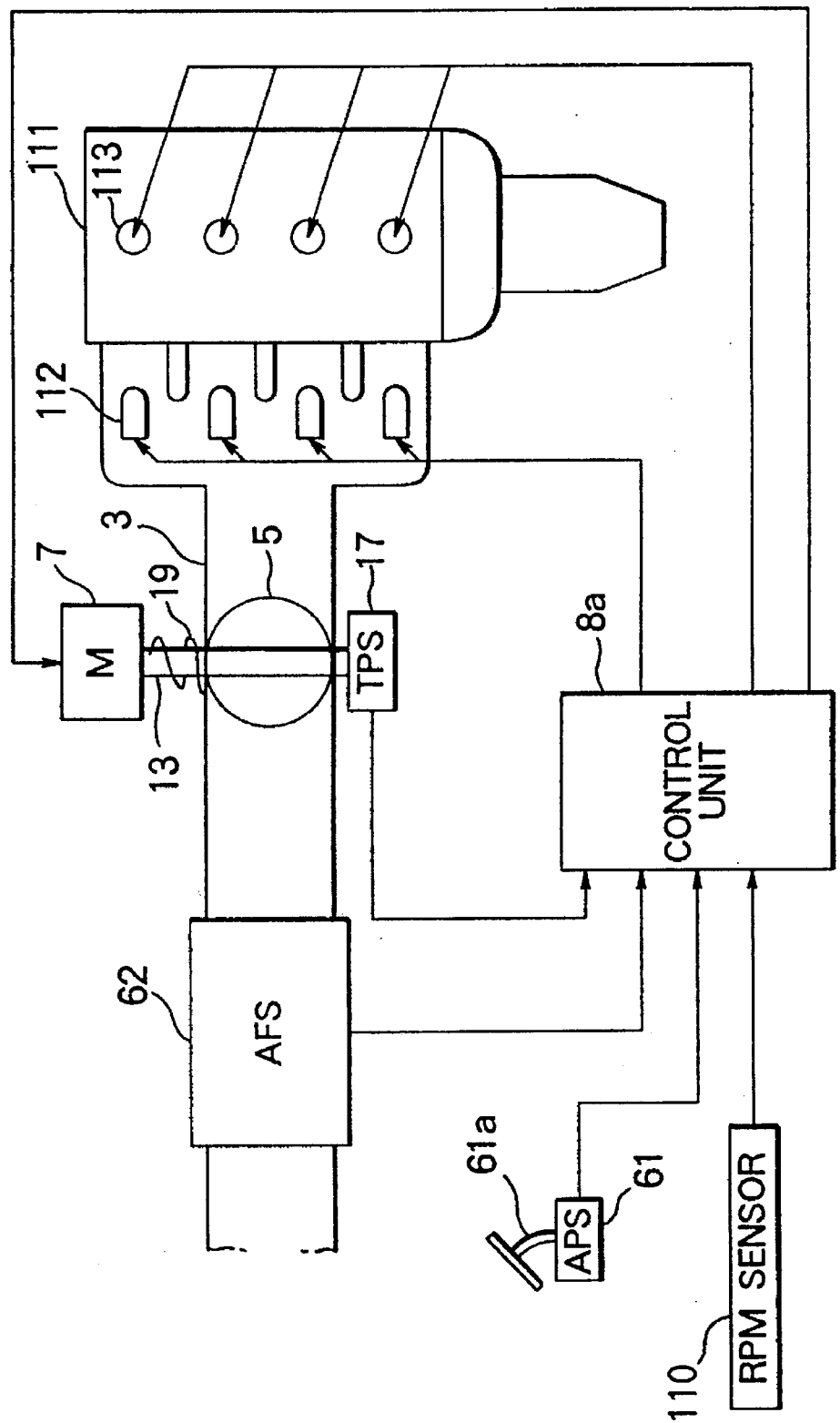
FIG. 21 is a block diagram showing the overall structure of another conventional vehicle control device.

FIG. 9 is a block diagram showing the overall structure of another vehicle control device according to this invention. The structure shown in FIG. 9 is similar to that of FIG. 21, except for the following points. A load sensor 115 generates an output corresponding to the load condition of the auxiliary parts associated with the engine such as the air conditioner, the power steering driving device, and the electrical system of the vehicle. The airflow through a bypass pipe 64a, which is coupled to the air-intake pipe 3 to bypass the throttle valve is controlled by a bypass control valve 64. The transmission ratio of an automatic transmission 118 is controlled by an oil-pressure solenoid 119.

Figure 22:
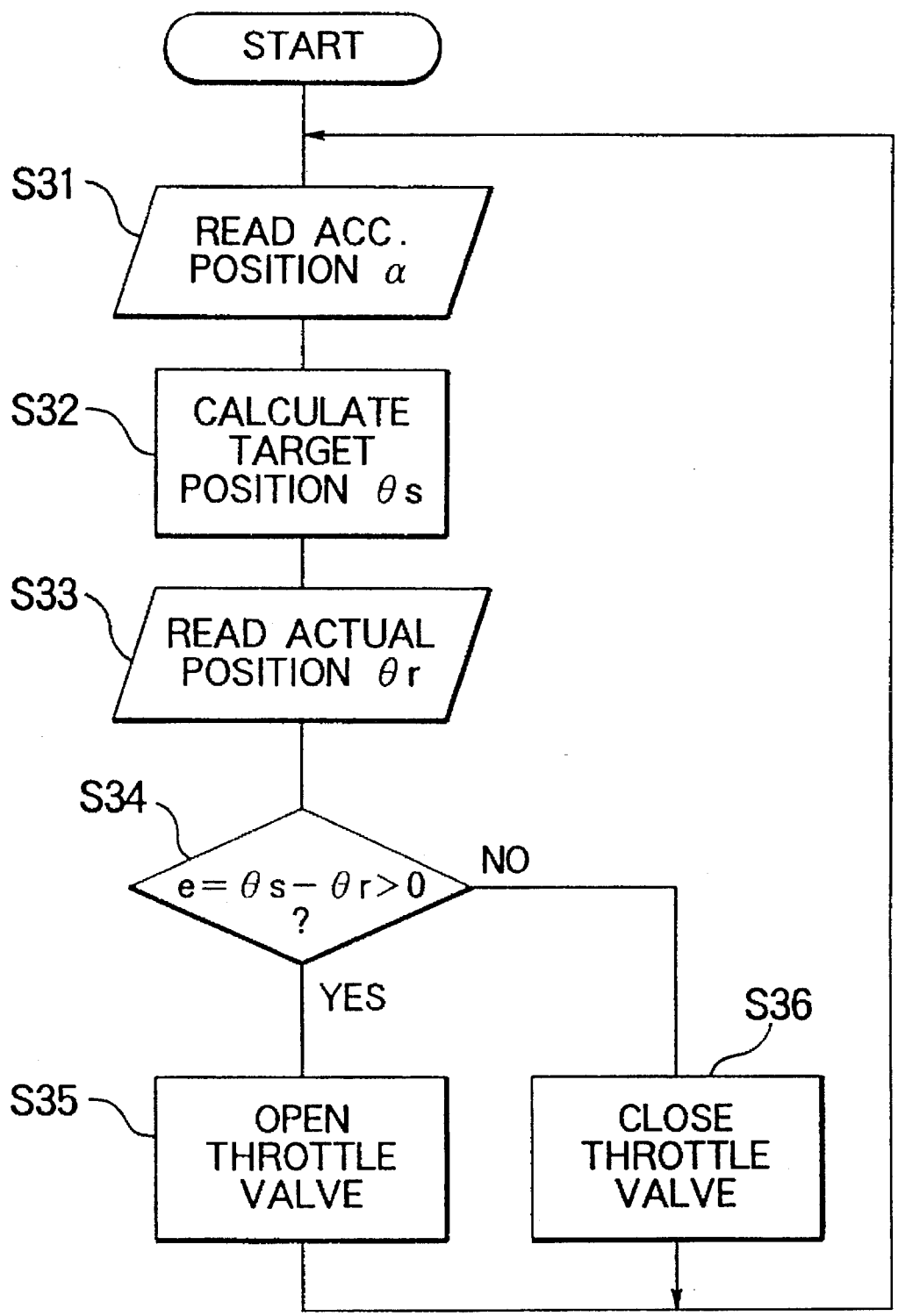
FIG. 22 is a flowchart showing the control procedure followed by the vehicle control device of FIG. 21.
Figure 23:
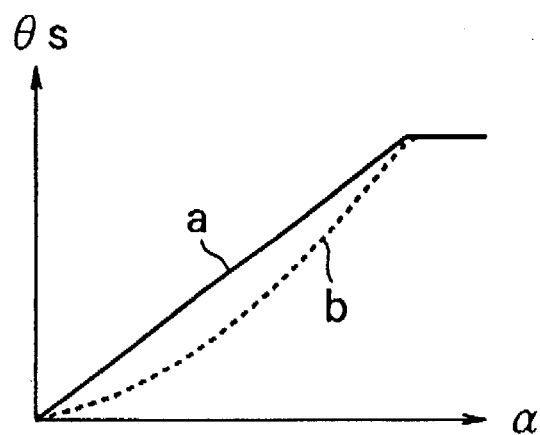
FIG. 23 shows the typical relation between the acceleration pedal position α and the target throttle valve position θs.
Figure 24:
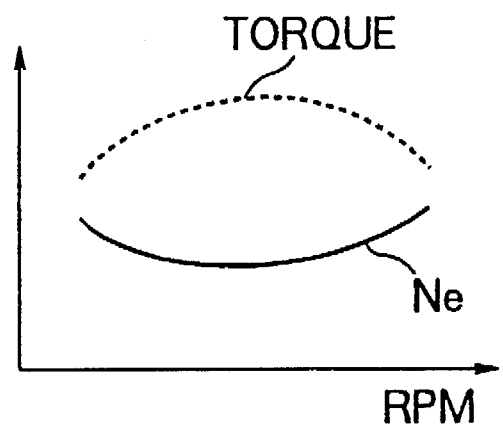
FIG. 24 shows the relation between the rpm of the engine and the correction factor Ne (solid curve) and the relation between the rpm of the engine and the output torque of the engine (dotted curve)
Figure 25:
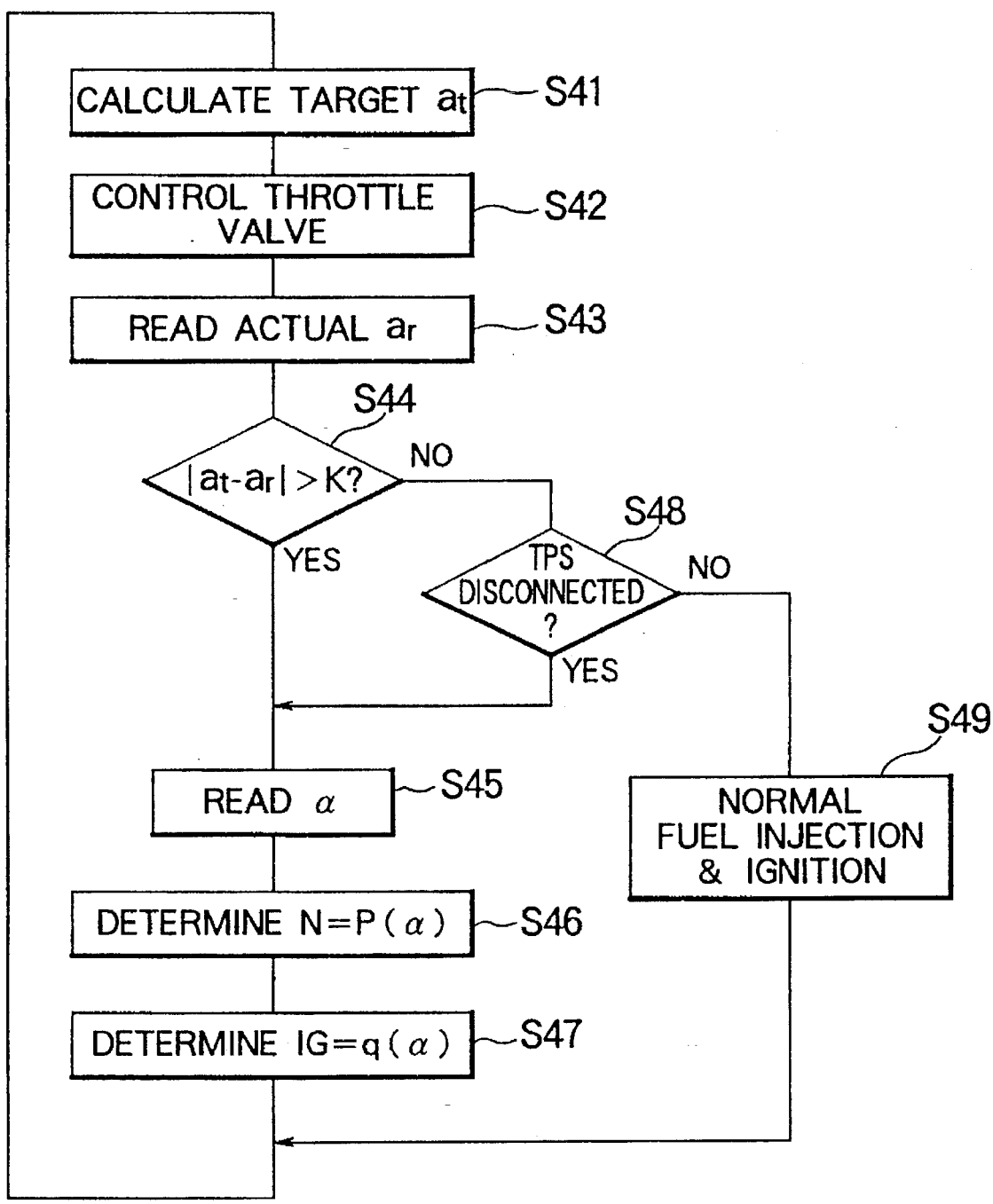
FIG. 25 is a flowchart showing the fuel injection and the ignition operation of the vehicle control device of FIG. 21.

The operation of the vehicle control device of FIG. 9 is as follows. The control of the throttle actuator 7 is performed in accordance with the procedure of FIG. 22 as described above. It is also known to control the idling rpm of the engine by adjusting the air-intake through the bypass pipe 64a by means of the bypass control valve 64. The fundamental method of the idling speed control is to adjust the position of the bypass control valve 64 by an open loop in response to the load condition of the auxiliary parts associated with the engine such as the air conditioner, the power steering driving device, and the electrical system of the vehicle. Thus, when the acceleration pedal 61a is not kicked and the throttle valve 5 is closed, the idling rpm of the engine is controlled to a predetermined level by the feedback control.

Figure 10:
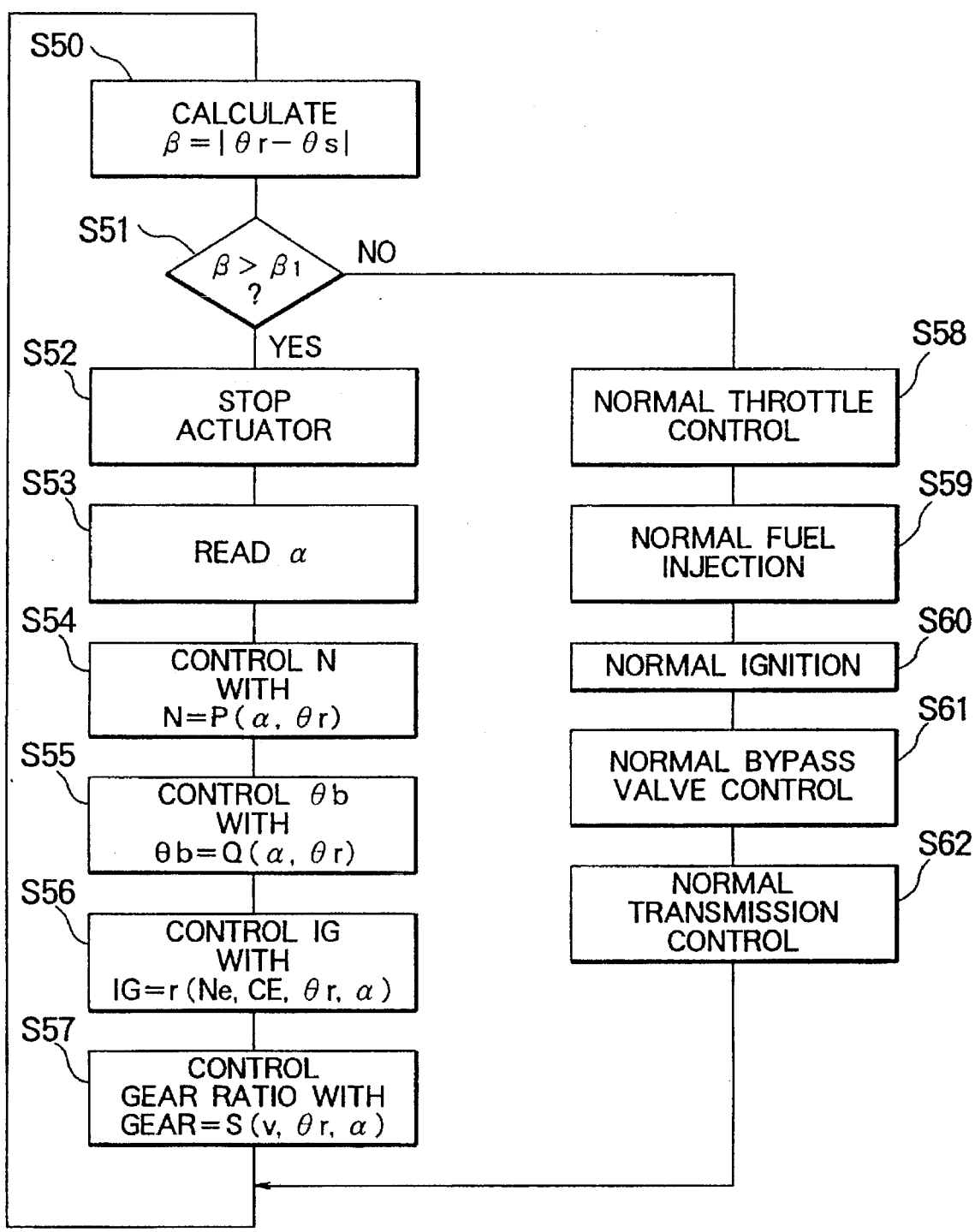
FIG. 10 is a flowchart showing the control procedure followed by the vehicle control device of FIG. 9.

Next, the operation of the vehicle control device of FIG. 9 upon occurrence of failure in the control system of the throttle actuator 7 is described by reference to FIG. 10. FIG. 10 is a flowchart showing the control procedure followed by the vehicle control device of FIG. 9.

At step S50, the deviation $\beta=|\theta r-\theta s|$ of the actual throttle valve position $\theta s$ from the target throttle valve position $\theta s$ is calculated. The deviation $\beta$ does not become greater than a predetermined reference level $\beta 1$ if the control system of the throttle actuator 7 is operating normally. Thus, at step S51, it is judged whether or not the deviation $\beta$ is greater than the predetermined reference level $\beta 1$. If the judgement is affirmative at step S51 (i.e., if there is an occurrence of failure in the control system of the throttle actuator 7), the execution proceeds to step S52 to deal with the failure at steps S52 through S57. On the other hand, if the judgement is negative at step S51, the execution proceeds to step S58 to execute the steps S59 through S62, where the normal control operation of the engine is performed in a well-known manner. Namely at step S58, the throttle actuator 7 is controlled in accordance with the procedure of FIG. 22. At step S59, the injectors are driven normally to inject the fuel into all the cylinders. At step S60, the normal ignition control is performed. At step S61, the bypass control valve 64 is controlled to regulate the idling rpm of the engine when the acceleration pedal 61a is not kicked. At step S62, the automatic transmission is controlled normally.

As described above, the execution proceeds to step S52 if the judgement is affirmative at step S51. At step S52, the driving of the throttle actuator 7 is stopped, such that the throttle valve 5 is urged to the idle or the closed position by the return spring 19. The throttle valve 5 may, however, be fixed upon occurrence of failure at the fully or intermediately open position. Thus, at step S53, the acceleration pedal position $\alpha$ is read in from the acceleration pedal position sensor 61. At step S54, the number of fuel-injected cylinders N is determined on the basis of the acceleration pedal position $\alpha$ and the actual throttle valve position $\theta r$: $N=P(\alpha, \theta r)$, and the number of cylinders into which the fuel is injected is limited to N. The output power of the engine is thus controlled in accordance with the intention of the driver.

Figure 11:
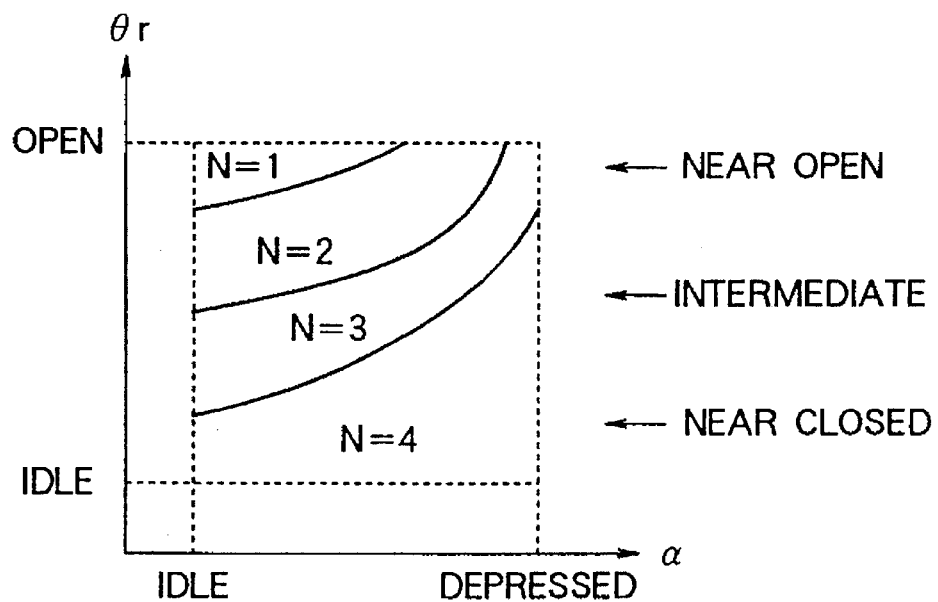
FIG. 11 shows an exemplary pattern of the number N of the fuel-injected cylinders plotted upon the plane of the acceleration pedal position α and the actual throttle valve position θr.

FIG. 11 shows an exemplary pattern of the number N of the fuel-injected cylinders plotted upon the plane of the acceleration pedal position $\alpha$ and the actual throttle valve position $\theta r$. The pattern is similar to that shown in the table of FIG. 3. If the throttle valve 5 is fixed near the fully open position as indicated by the top arrow in FIG. 11, the number N of fuel-injected cylinders increases from one to two to three as the acceleration pedal position α changes from the idle to the fully open position. Similarly, if the throttle valve 5 is fixed near the intermediate position as indicated by the middle arrow in FIG. 11, the number N of fuel-injected cylinders increases from two to three to four as the acceleration pedal position α changes from the idle to the fully open position. The output power of the engine is thus controlled in accordance with the intention of the driver. On the other hand, if the throttle valve 5 is fixed near the fully closed position as indicated by the bottom arrow in FIG. 11, the number N of fuel-injected cylinders is held at four, since the output power of the engine is small even if all the cylinders are supplied with the fuel. Further, the rotation of the engine may be halted if the number N of the fuel-injected cylinders are reduced when the throttle valve 5 is nearly closed. Thus, the output power of the engine cannot be effectively controlled only by the adjustment of the number N of the fuel-injected cylinders.

Figure 12:
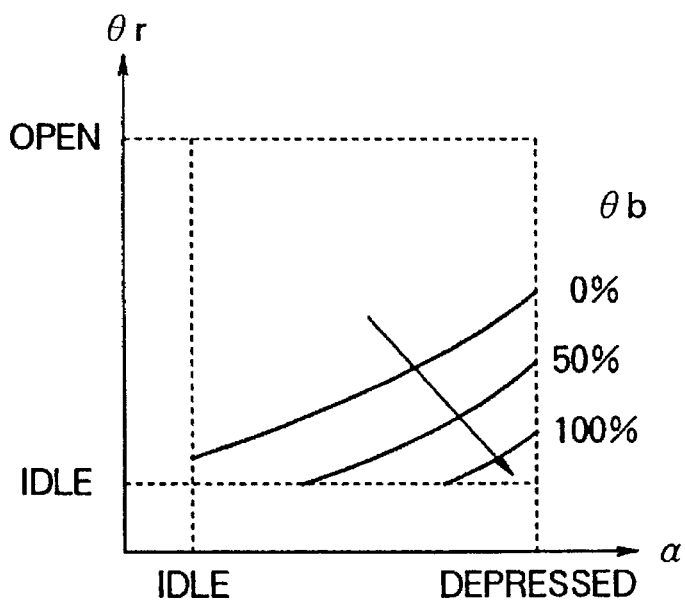
FIG. 12 shows an exemplary contours of the bypass control valve position θb (corresponding to 0%, 50% and 100% of θb) plotted upon the plane of the acceleration pedal position α and the actual throttle valve position θr.

Thus at step S55, the bypass control valve position θb is determined on the basis of the acceleration pedal position α and the actual throttle valve position θr: θb=Q(α,θr), and the position of the bypass control valve 64 is controlled accordingly. FIG. 12 shows an exemplary contours of the bypass control valve position θb (corresponding to 0%, 50% and 100% of θb) plotted upon the plane of the acceleration pedal position α and the actual throttle valve position θr. As shown by the arrow in FIG. 12, the bypass control valve position θb corresponding to the opening degree of the bypass pipe 64a increases from 0 to 100% toward the right bottom corner where the acceleration pedal position α is fully depressed and the actual throttle valve position θr is at the idle. Thus, when the actual throttle valve position θr is near the closed position, the opening of the bypass control valve 64 increases from 0 to 100% as the acceleration pedal position α changes from the idle to the fully depressed position, thereby controlling the output power of the engine in accordance with the intention of the driver. When the actual throttle valve position θr is above a certain level, however, the bypass control valve position θb remains at 0%.

Figure 13:
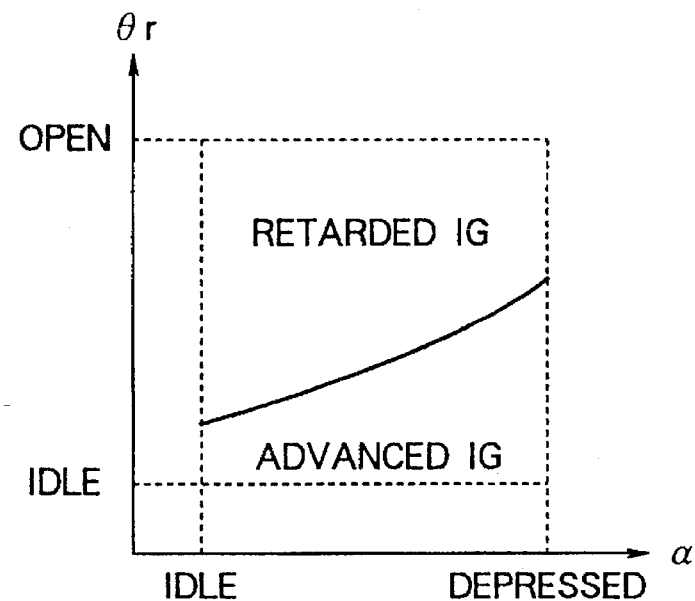
FIG. 13 shows an exemplary pattern of the retarded and normally advanced ignition timing IG regions plotted upon the plane of the acceleration pedal position a and the actual throttle valve position θr.

At step S56, the ignition timing IG is determined on the basis of the acceleration pedal position α and the actual throttle valve position θr as well as the rpm Ne of the engine and the filling efficiency CE of the engine: IG=r(Ne,CE, θr, α). FIG. 13 shows an exemplary pattern of the retarded and normally advanced ignition timing IG regions plotted upon the plane of the acceleration pedal position α and the actual throttle valve position θr. When the throttle valve 5 is fixed at a position allowing a relatively great amount of air-intake, the output power of the engine tends to become greater than is intended. Thus, in the retarded ignition timing IG region in FIG. 13, the ignition timing IG is retarded to reduce the output power of the engine. This retarded ignition timing IG region corresponds roughly to the 0% region of the bypass control valve position θb in FIG. 12, or to the region where the number N of the fuel-injected cylinders is from one to three in FIG. 11. If, however, the acceleration pedal position α and the actual throttle valve position θr falls within the advanced ignition timing IG region in FIG. 13, the ignition tiding IG is determined normally on the basis of the rpm Ne of the engine and the filling efficiency CE of the engine in accordance with the well-known method.

Figure 14:
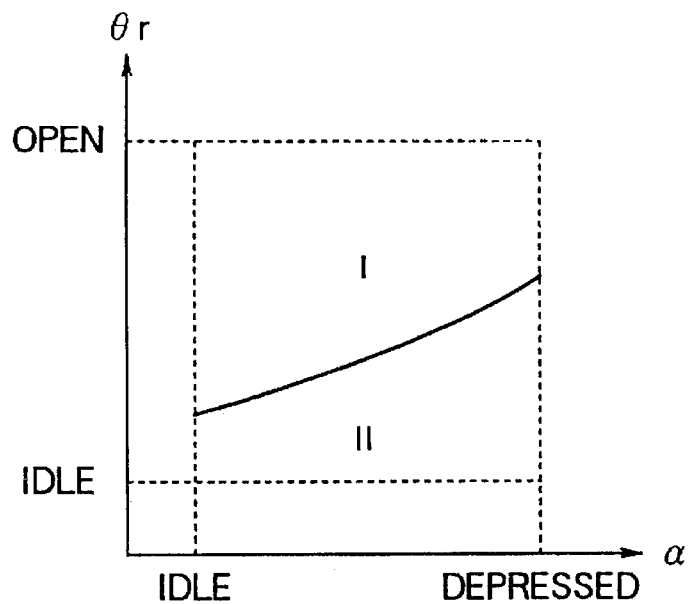
FIG. 14 shows an exemplary pattern of the two gear ratio control regions I and II plotted upon the plane of the acceleration pedal position α and the actual throttle valve position θr.
Figure 15:
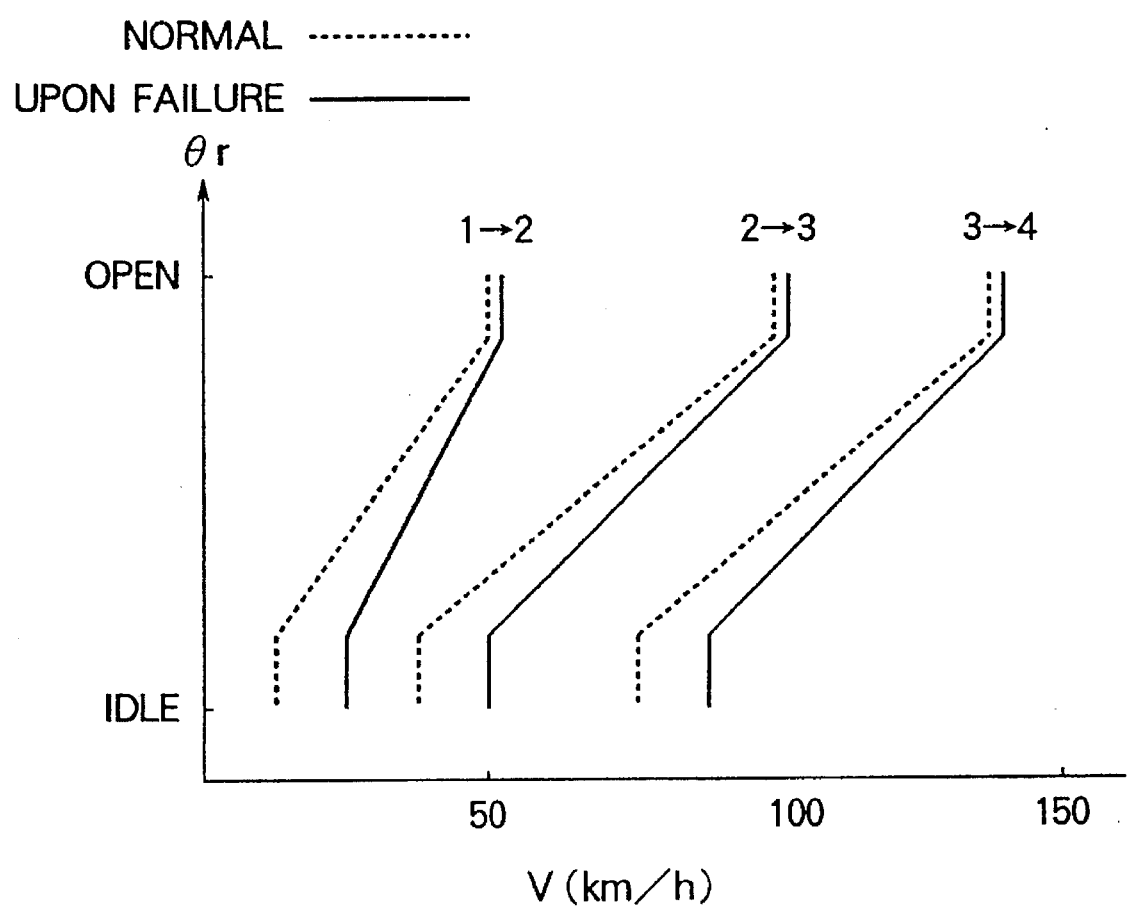
FIG. 15 shows the pattern of gear ratio change during the normal operation (dotted curve) and upon occurrence of failure (solid curve) plotted upon the plane of the vehicle speed V and the actual throttle valve position θr.

At step S67, the transmission or gear ratio GEAR of the automatic transmission is controlled on the basis of the vehicle speed V, the actual throttle valve position θr, and the acceleration pedal position α: GEAR=S(V, θr, α). FIG. 14 shows an exemplary pattern of the two gear ratio control regions I and II plotted upon the plane of the acceleration pedal position α and the actual throttle valve position θr. In the region I, the gear ratio GEAR is fixed, for example, to the third gear ratio such that the vehicle is driven at a low rpm of the engine. On the other hand, in the region II where the output power of the engine is controlled primarily by means of the bypass control valve 64, the gear ratio GEAR change is performed in accordance with the modified pattern shown in FIG. 15. FIG. 15 shows the pattern of gear ratio change during the normal operation (dotted curve) and upon occurrence of failure (solid curve) plotted upon the plane of the vehicle speed V and the actual throttle valve position θr. Both in the normal and failure-dealing operations, the gear ratio is changed from the first to the second, from the second to the third, and from the third to the fourth as the vehicle speed V increases. However, to deal with the occurrence of failure in the region II in FIG. 14, the gear ratio change takes place at a higher vehicle speed V such that the acceleration performance of the vehicle is improved.

In the case of the vehicle control device of FIG. 9, the failure of the control system of the throttle actuator 7 is judged on the basis of the level of the deviation β between the target throttle valve position θs and the actual throttle valve position θr. The occurrence of failure, however, may be determined from the relation between the amount of air-intake (the output of the airflow sensor 62) and the acceleration pedal position α or, the target throttle valve position θs. It is also possible to add other sensors to improve the reliability of the judgment.

Further, when the number N of the fuel-injected cylinders is changed, a shock may be experienced. Thus, a non-sensitive region (hysteresis) may be provided for the reference level by which the number of the fuel-injected cylinders is changed. Alternatively, the change of the number of fuel-injected cylinders may be suppressed for a predetermined length of time after an occurrence of the change of the huebet of the fuel-injected cylinders. Furthermore, if the automatic transmission includes a lock-up mechanism, the lock-up may be suppressed during the procedure for dealing with an occurrence of failure, such that the shock of the change of the fuel-injected cylinders may be absorbed by the torque converter.

Further improvement may be obtained in the case of the gear ratio change and the transmission oil pressure control operation using the actual throttle valve position θr as the parameter representing the output power of the engine, if θr+g(θb) is used instead of actual throttle valve position θr, where g is a predetermined function and θb is the position of the bypass control valve 64. The accuracy of the parameter representing the output power of the engine can thus be improved and the control reliability and accuracy are enhanced.

Furthersores the control operations of the throttle actuator 7, the injectors 112, the bypass control valve 64, and the automatic transmission 118 may be performed by separate units which are coupled to each other via signal lines. Further, it is possible to change the disabled cylinders (the cylinders into which the fuel is not injected) periodically, taking into consideration the interval between the ignitions. The thermal balance of the engine 111 can thus be improved and the life thereof is prolonged.

Still further, when the throttle valve 5 is fixed at a position allowing a certain amount of air-intake and the number N of the fuel-injected cylinders is controlled to adjust the output power of the engine, the rpm at which the fuel cut is performed for preventing the over-speed rotation of the engine may be set lower than the normal level. Further, the fuel cut rpm of the engine may be changed in accordance with the gear ratio of the automatic transmission, the load condition of the auxiliary parts associated with the engine, or the temperature condition of the engine. Still further, it is possible to alarm the driver of the vehicle of the abnormality during the procedure dealing with an occurrence of failure.

Figure 16:
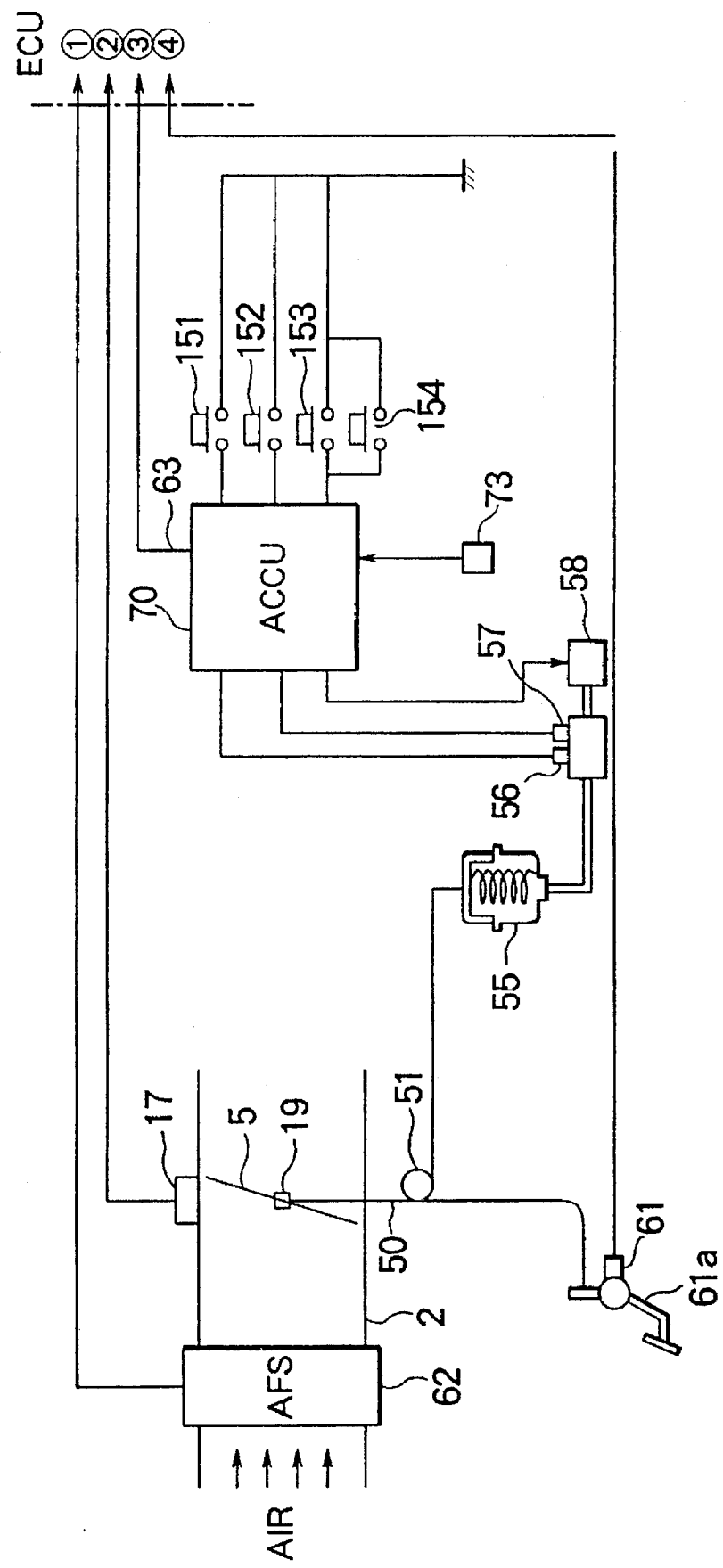
FIG. 16 is a block diagram showing a part of a vehicle control device provided with a automatic cruising control capability according to this invention.
Figure 17:
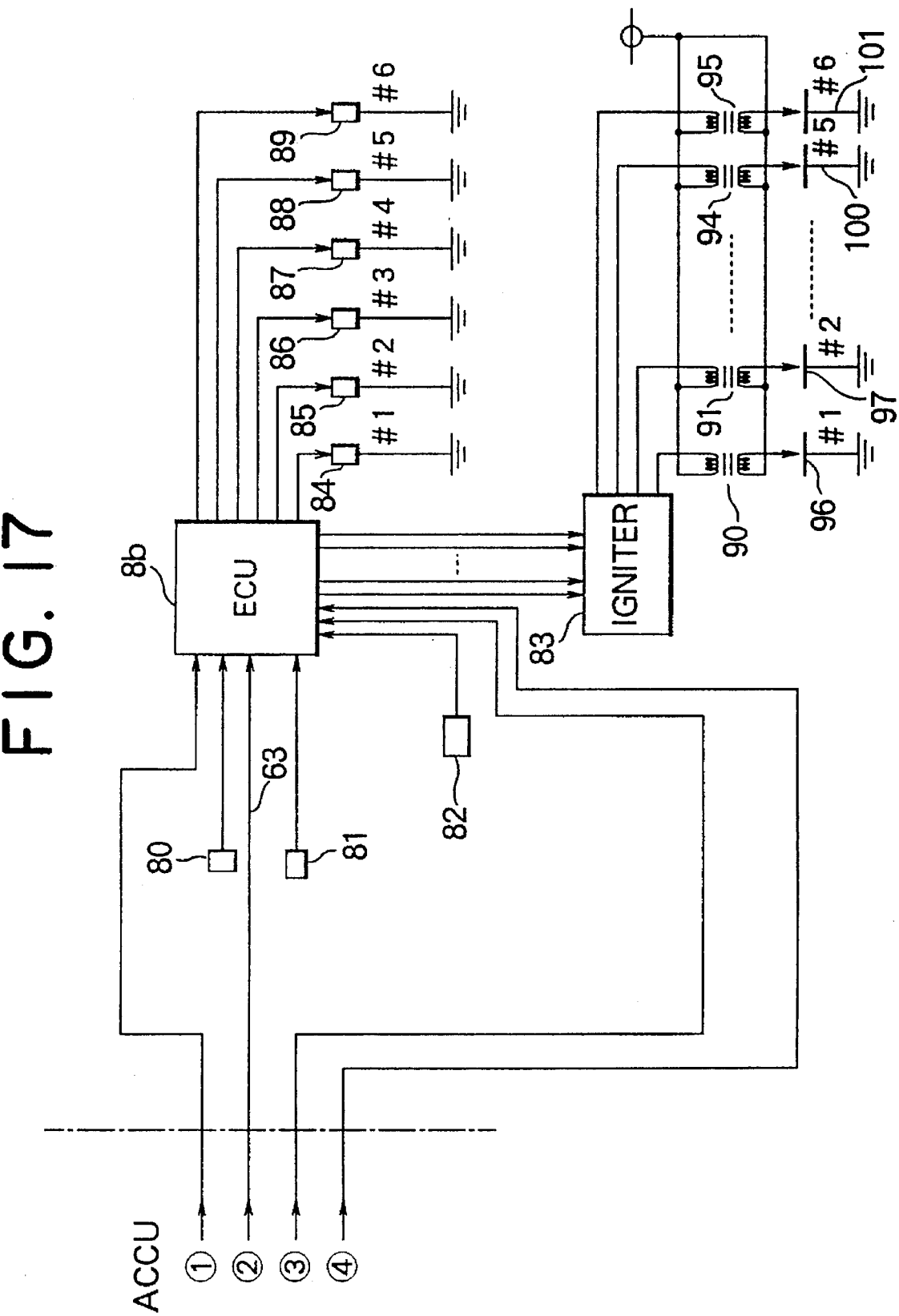
FIG. 17 is a block diagram showing the remaining part of the vehicle control device of FIG. 16 associated with the engine control unit 8b.

FIG. 16 is a block diagram showing a part of a vehicle control device provided with a automatic cruising control capability according to this invention. The structure shown in FIG. 16 is similar to that shown in FIG. 26 except for the following points. The automatic cruising control unit 70 outputs a failure signal 63 to an engine control unit 8b (described hereinbelow) when the automatic cruising control becomes infeastble due to an occurrence of failure in the driving system of the throttle valve during the automatic cruising control performed by the automatic cruising control unit 70, A throttle position sensor 17 detects the position of the throttle valve 5. An acceleration pedal position sensor 61 detects the position of the acceleration pedal 61a of the vehicle. An airflow sensor 62 measures the amount of air-intake into the engine (not shown). The throttle position sensor 17, the acceleration pedal position sensor 61 and the airflow sensor 62 form part of the engine control device and supplies the outputs thereof to the engine control unit 8b, FIG. 17 is a block diagram showing the remaining part of the vehicle control device of FIG. 16 associated with the engine control unit 8b. The figure shows the case where the present invention is applied to a six-cylinder engine mounted on a vehicle with an automatic transmission. The structure shown in FIG. 17 is similar to the corresponding part of FIG. 1. Thus, the part of the vehicle control device shown in FIG. 17 includes: an engine control unit 8b for controlling the fuel injection and the ignition timings in response to the outputs from the various sensors; a crank angle sensor 82 for detecting the position of the crankshaft and the rpm of the engine; an inhibitor switch 80 by which the neutral (N) and the parking (P) modes of the automatic transmission are detected; a water temperature sensor 81 for detecting the temperature of the coolant water of the engine; injectors 84 through 89 for respective cylinders #1 through #6 of the engine; and an igniter 83 for turning on and off the current supply to the ignition coils 90 through 95 to ignite the ignition plugs 96 through 101 of the respective cylinders #1 through #6. The outputs from the airflow sensor 62 and the throttle position sensor 17, the failure signal 63 output from the automatic cruising control unit 70, and the output from the acceleration pedal position sensor 61 are supplied to the engine control unit 8b.

Figure 19:
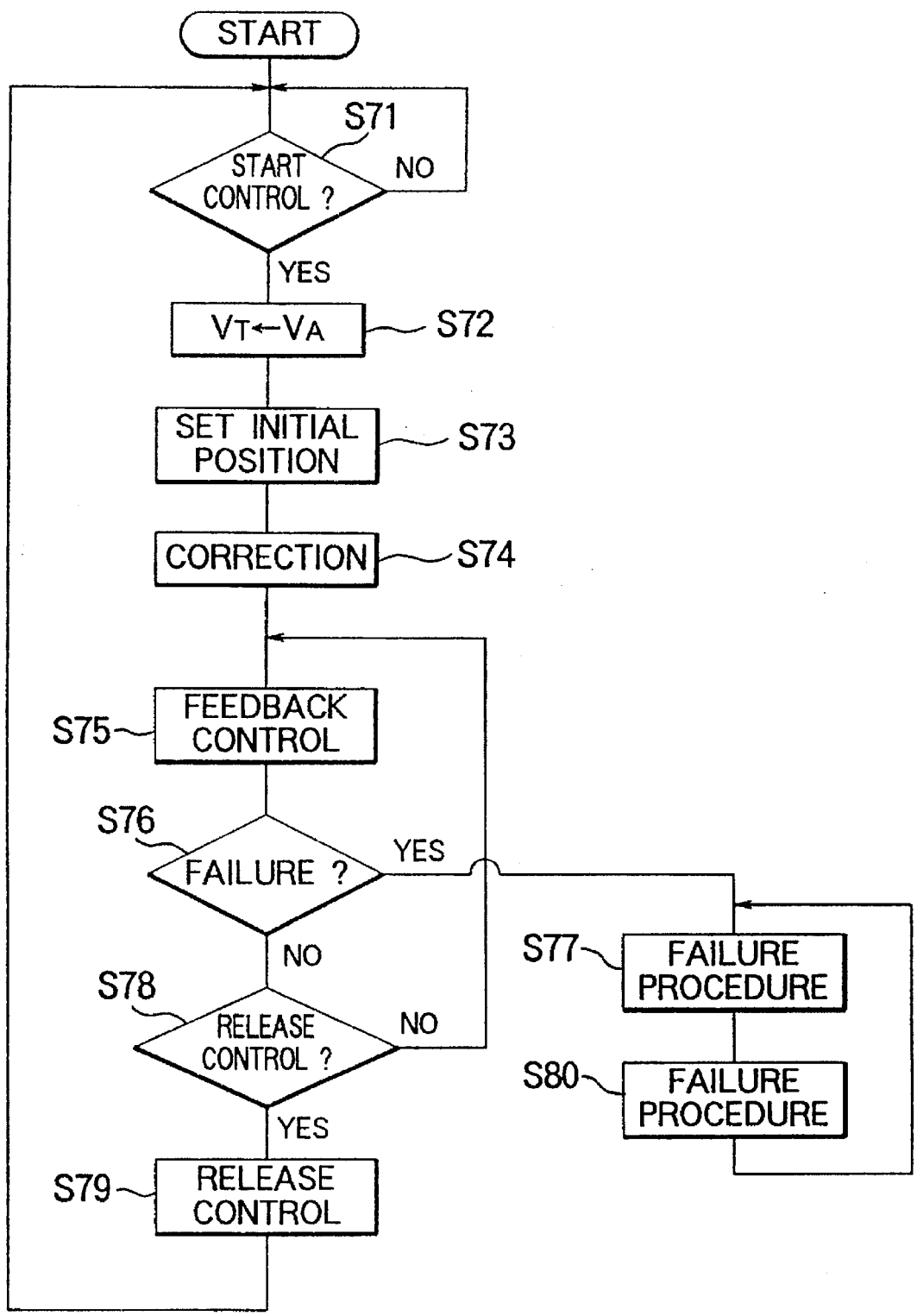
FIG. 19 is a flowchart showing the automatic cruising control operation of the Automatic cruising control unit of FIG. 16.
Figure 20:
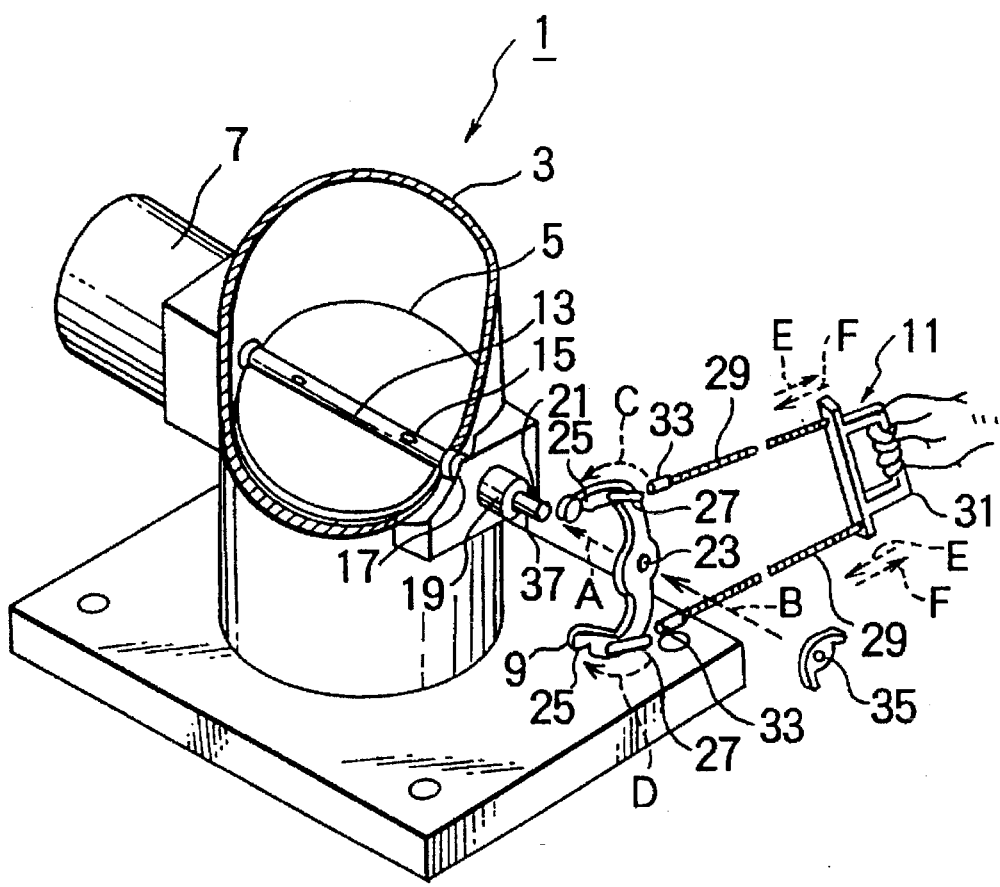
FIG. 20 is a partially cut-away perspective view of a throttle body with a conventional emergency throttle operating system.
Figure 27:
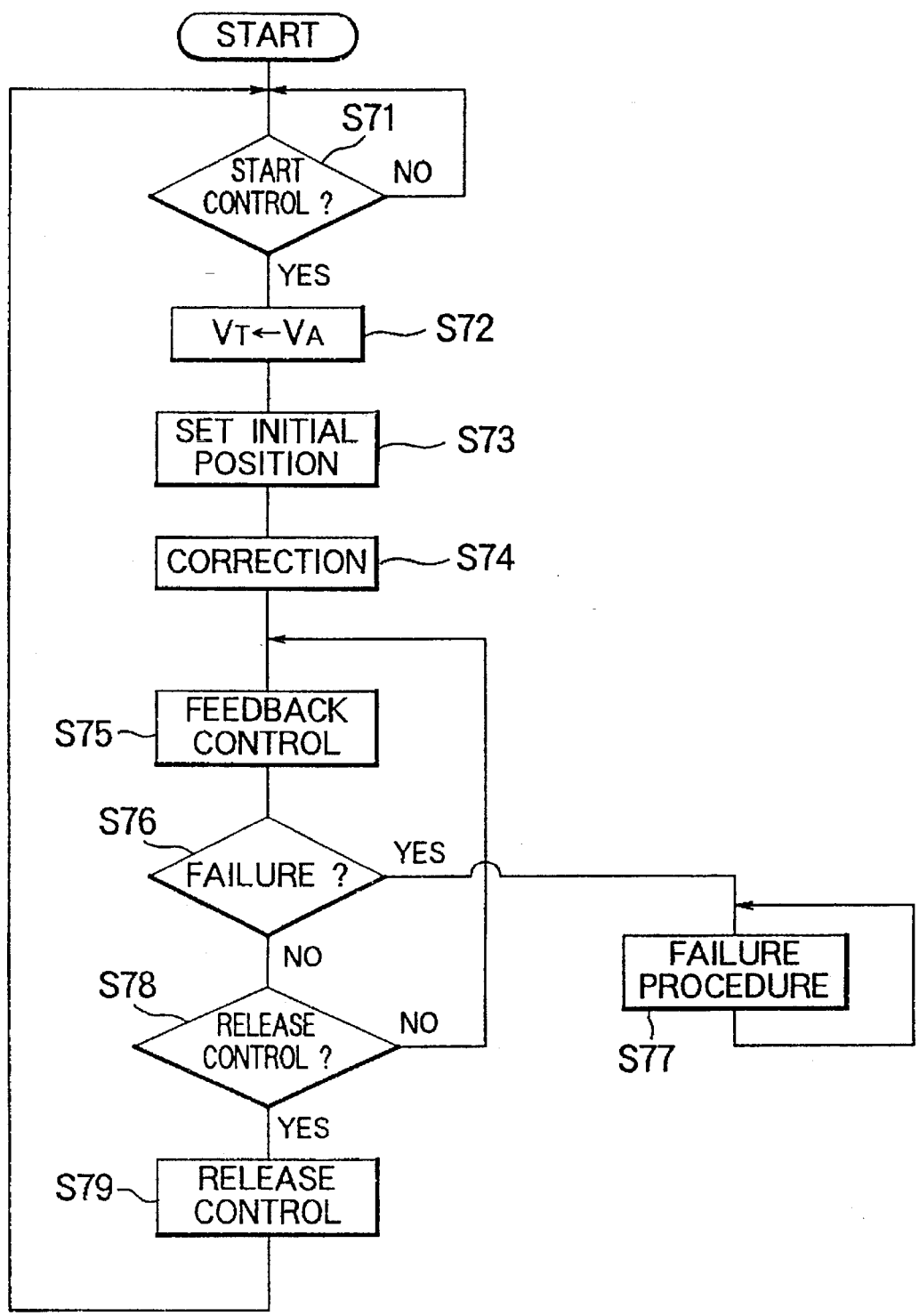

FIG. 19 is a flowchart showing the automatic cruising control operation of the automatic cruising control unit of FIG. 16. The procedure is similar to that of FIG. 27 with respect to the steps S71 through S79. In the case of the procedure of FIG. 19, however, the execution proceeds to step S80 after the step S77. At step S80, the automatic cruising control unit 70 outputs the failure signal 63 to the engine control unit 8b when the automatic cruising control becomes infeasible due to an occurrence of failure in the driving system of the throttle valve during the automatic cruising control. Then, the engine control unit 8b performs the steps similar to that of FIG. 4 described above by reference to FIGS. 2a through 2c and FIG. 3. Thus, when the throttle valve becomes incapable of control, the engine control unit 8b adjusts (or cuts down) the amount of air-intake through the bypass control valve 64 on the basis of the failure signal 63, so as to control the output power of the engine.

Next the "limp home" function,of the vehicle control device of FIG. 16 is described. The "limp home" function provided by the vehicle control device of FIG. 16 is similar to that provided by the vehicle control device of FIG. 1. Thus, when the throttle valve becomes incapable of control, the control valve 56 and the release valve 57 are opened, such that the driving of the throttle link 50 by the vacuum actuator 55 is interrupted and the throttle valve 5 is urged toward the idle position by the return spring 19. However, the shaft of the throttle valve may be mechanically locked by the locking of the electric motor of the throttle actuator 7, or the throttle link 50 say be stuck and fixed. Then, the throttle shaft 13 is fixed at a position upon the occurrence of the failure.

Figure 18:
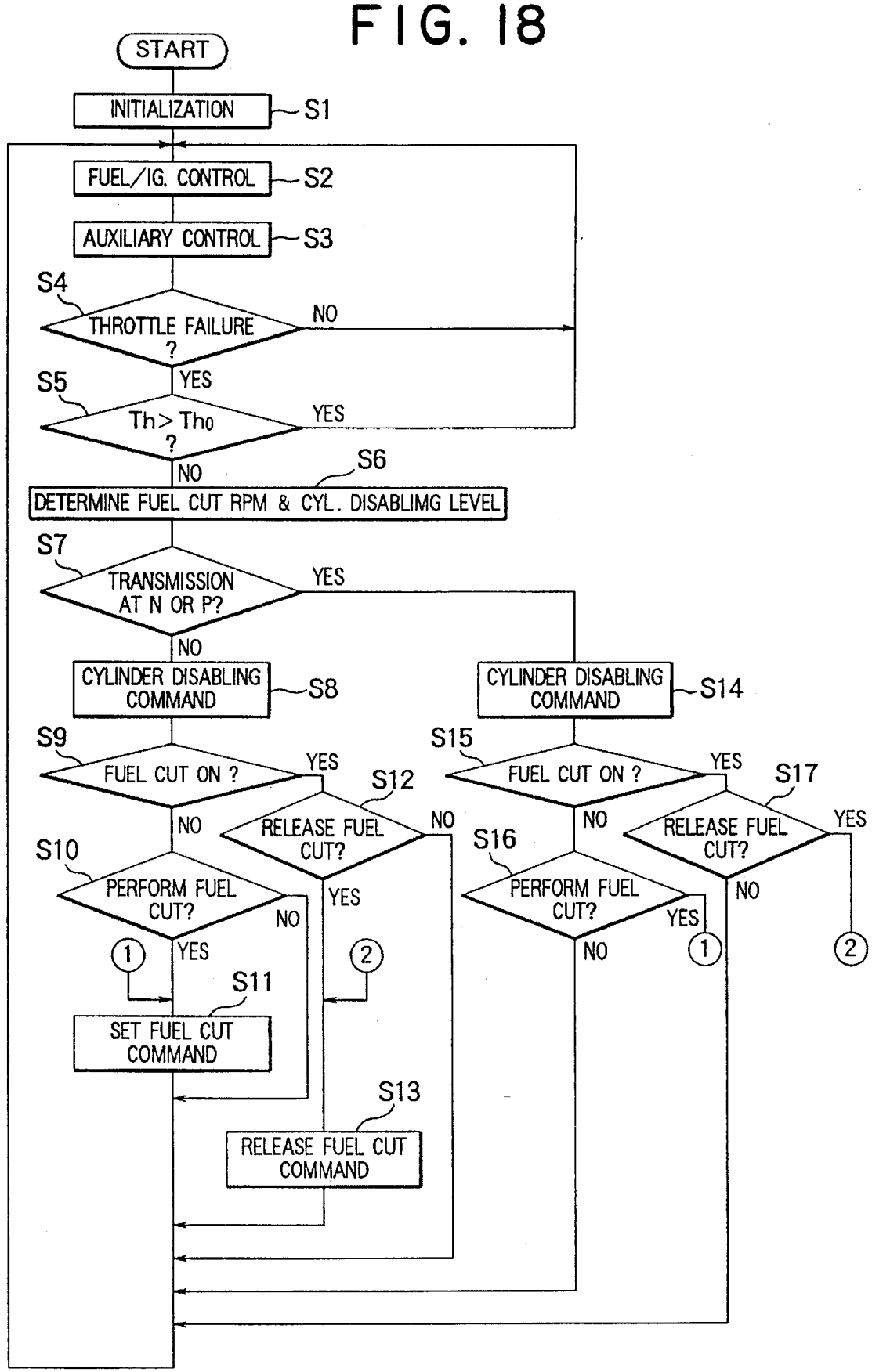
FIG. 18 is a flowchart showing the procedure performed by the engine control unit 8b for providing the "limp home" function similar to that of FIG. 4.

When the throttle valve is incapable of control, the engine control unit 8b detects an occurrence of failure on the basis of the failure signal 63, and only if the throttle valve is fixed at a position where the opening of the throttle valve is greater than a predetermined level, some of the cylinders #1 through #6 are disabled to provide the "limp home" function in accordance with the relation shown in FIG. 3 (when the automatic transmission is at a gear ratio other than the N or the P position and the vehicle is being driven), or in accordance with FIG. 2a (where the automatic transmission is at the N or the P position). The details of the cylinder disabling are the same as in the case of the vehicle control device of FIG. 1 described above, FIG. 18 is a flowchart showing the procedure performed by the engine control unit 8b for providing the "limp home" function similar to that of FIG. 4. In the case of the procedure of FIG. 18, however, the execution returns directly from step S5 to step S2. Otherwise, the procedure is similar to that of FIG. 4. Further, the fuel cut is performed in accordance with the routine shown in FIG. 5.

In the case of the vehicle control device of described above, the invention is applied to a six-cylinder engine of the low voltage distribution type vehicle. However, the vehicle control device of FIGS. 16 and 17 is applicable to an eight- or twelve-cylinder engine or to the high voltage distribution type vehicle. Further, the vacuum actuator 55 may be replaced by an actuator using a DC motor which directly drives the throttle link 50.

What is claimed is:

1. A vehicle control device for controlling an output power of a multi-cylinder engine upon an occurrence of a failure in parts associated with said engine, said vehicle control device comprising:

acceleration pedal position sensor means for detecting a position of an acceleration pedal, said acceleration pedal position sensor means generating an output corresponding to said position of said acceleration pedal;

engine rotational speed sensor means for detecting an engine rotational speed of the engine;

throttle means, including a throttle valve disposed in an air-intake pipe coupled to said engine, for regulating an amount of air-intake into said engine;

failure detector means for detecting an occurrence of a failure in said throttle means; and means for enabling a reduced output power limp home operation of the vehicle in response to the occurrence of a failure in the throttle means as detected by the failure detector means, said enabling means comprising control means coupled to said acceleration pedal position sensor means, said engine rotational speed sensor means and said failure detector means for disabling some cylinders of said multi-cylinder engine in accordance with said output of said acceleration pedal position sensor means when the rotational speed of the engine detected by said engine rotational speed sensor means is less than or equal to a predetermined level and upon detection of a throttle means failure.

2. A vehicle control device as claimed in claim 1, further comprising:

throttle position sensor means for detecting a throttle valve position of said throttle valve, said throttle position sensor means generating an output corresponding to said throttle valve position;

wherein said control means is further coupled to said throttle position sensor means and, when said failure detector means detects an occurrence of a failure, disables some of cylinders of said multi-cylinder engine in accordance with outputs of said acceleration pedal position sensor means and said throttle position sensor means.

3. A vehicle control device as claimed in claim 2, further comprising:

a bypass control valve disposed in a bypass pipe bypassing said air-intake pipe;

wherein when said failure detector means detects an occurrence of a failure, said control means further controls a position of said bypass control valve in accordance with outputs of said acceleration pedal position sensor means and said throttle position sensor means.

4. A vehicle control device as claimed in claim 2, wherein when said failure detector means detects an occurrence of a failure and said engine rotational speed detected by said engine rotational speed sensor means exceeds a predetermined level, said control means performs a fuel cut control of said engine, wherein said fuel cut control cuts fuel to all cylinders of the multi-cylinder engine.

5. A vehicle control device as claimed in claim 2, further comprising:

transmission detector means for detecting a mode of a transmission which transmits a torque of said engine to road wheels of a vehicle, said transmission detector means generating an output indicating whether or not said torque of said engine is transmitted to said road wheels;

wherein said control means is further coupled to said transmission detector means, and, when said failure detector means detects an occurrence of a failure and said output of said transmission detector means indicates that said torque of said engine is transmitted to said road wheels, disables said cylinders in accordance with a first predetermined relation between a number of disabled cylinders and said outputs of said acceleration pedal position sensor means and said throttle position sensor means.

6. A vehicle control device as claimed in claim 5, wherein, when said failure detector means detects an occurrence of a failure and said output of said transmission detector means indicates that said torque of said engine is not transmitted to said road wheels, said control means disables said cylinders in accordance with a second predetermined relation between a number of disabled cylinders and said outputs of said throttle position sensor means.

7. A vehicle control device as claimed in claim 1, further comprising:

vehicle speed sensor means for detecting a vehicle speed of a vehicle driven by said engine; and automatic cruising control means, coupled to said vehicle speed sensor means, for controlling said vehicle speed detected by said vehicle speed sensor means to a target vehicle speed, wherein said automatic cruising control means includes said failure detector means and detects an occurrence of a failure when automatic cruising control becomes infeasible.

8. A vehicle control device as claimed in claim 7, wherein said automatic cruising control means detects an occurrence of a failure when a deviation of said vehicle speed detected by said vehicle speed sensor means from said target vehicle speed exceeds a predetermined level.

9. A vehicle control device as claimed in claim 2, further comprising:

throttle actuator means for controlling said position of said throttle valve to a target throttle valve position;

wherein said failure detector means is coupled to said throttle actuator means and said throttle position sensor means, and detects an occurrence of a failure when a deviation of said throttle valve position detected by said throttle position sensor means from said target throttle valve position exceeds a predetermined level.

10. A vehicle control device as claimed in claim 9, further comprising:

a bypass control valve disposed in a bypass pipe bypassing said air-intake pipe;

wherein, when said failure detector means detects an occurrence of a failure, said control means further controls a position of said bypass control valve in accordance with said output of said acceleration pedal position sensor means.

11. A vehicle control device as claimed in claim 9, further comprising:

a bypass control valve disposed in a bypass pipe bypassing said air-intake pipe;

wherein, when said failure detector means detects an occurrence of a failure, said control means further controls a position of said bypass control valve in accordance with said outputs of said acceleration pedal position sensor means and said throttle position sensor means.

12. A vehicle control device as claimed in claim 10, further comprising:

an automatic transmission which transmits a torque of said engine to road wheels of a vehicle at a plurality of transmission ratios;

wherein, when said failure detector means detects an occurrence of a failure, said control means further controls said transmission ratio of said automatic transmission in accordance with said output of said acceleration pedal position sensor means.

13. A vehicle control device as claimed in claim 11, further comprising;

an automatic transmission which transmits a torque of said engine to road wheels of a vehicle at a plurality of transmission ratios;

wherein, when said failure detector means detects an occurrence of a failure, said control means further controls said transmission ratio of said automatic transmission in accordance with outputs of said acceleration pedal position sensor means and said throttle position sensor means.

* * * * *